(12) United States Patent
Yamada et al.

(10) Patent No.: US 8,242,654 B2
(45) Date of Patent: Aug. 14, 2012

(54) ROTOR AND MOTOR

(75) Inventors: Yoji Yamada, Hamamatsu (JP); Seiya Yokoyama, Toyohashi (JP); Shigemasa Kato, Toyohashi (JP); Yoshiaki Takemoto, Toyohashi (JP); Yoko Tateishi, Kosai (JP)

(73) Assignee: Asmo Co., Ltd., Umeda, Kosai-Shi, Shizuoka-Ken (JP)

( * ) Notice: Subject to any disclaimer, the term of this patent is extended or adjusted under 35 U.S.C. 154(b) by 215 days.

(21) Appl. No.: 12/779,580

(22) Filed: May 13, 2010

(65) Prior Publication Data

US 2010/0308680 A1 Dec. 9, 2010

(30) Foreign Application Priority Data

May 20, 2009 (JP) ................................ 2009-122307
May 29, 2009 (JP) ................................ 2009-130633
Oct. 13, 2009 (JP) ................................ 2009-236271
May 11, 2010 (JP) ................................ 2010-109371

(51) Int. Cl.
*H02K 1/27* (2006.01)
*H02K 1/24* (2006.01)

(52) U.S. Cl. .......... 310/156.55; 310/156.54; 310/156.57

(58) Field of Classification Search ............ 310/156.54, 310/156.48, 156.55, 156.57, 156.59
See application file for complete search history.

(56) References Cited

U.S. PATENT DOCUMENTS

| | | | | |
|---|---|---|---|---|
| 4,661,736 A * | 4/1987 | Kawada et al. | .......... | 310/156.15 |
| 4,777,397 A * | 10/1988 | Parshall | .................. | 310/156.15 |
| 5,631,512 A * | 5/1997 | Kawabata et al. | ........ | 310/156.15 |
| 5,936,322 A * | 8/1999 | Yamaguchi et al. | ..... | 310/156.19 |
| 6,597,079 B2 * | 7/2003 | Miyashita et al. | ....... | 310/156.48 |
| 6,906,442 B2 * | 6/2005 | Yamaguchi | .............. | 310/156.43 |
| 2002/0135253 A1 * | 9/2002 | Sebastian et al. | ........ | 310/156.48 |

FOREIGN PATENT DOCUMENTS

| | | | |
|---|---|---|---|
| JP | 9-327139 | | 12/1997 |
| JP | 2001-169485 | * | 6/2001 |
| JP | 2004-173375 | * | 6/2004 |
| JP | 2004-357489 | | 12/2004 |
| JP | 2005-287265 | * | 10/2005 |
| WO | 03-003542 | * | 1/2003 |

* cited by examiner

*Primary Examiner* — Burton Mullins
(74) *Attorney, Agent, or Firm* — James R. Gourley; Celina M. Orr; Carstens & Cahoon, LLP

(57) ABSTRACT

A motor is disclosed that includes a rotor having a consequent-pole structure. The rotor core of the rotor includes a magnetic flux dividing portion at each position that faces one of the magnets. Each magnetic flux dividing portion forcibly divides magnetic flux in the vicinity of the backside of the corresponding magnet to both sides in the circumferential direction.

15 Claims, 30 Drawing Sheets

Fig.10A
Fig.10B
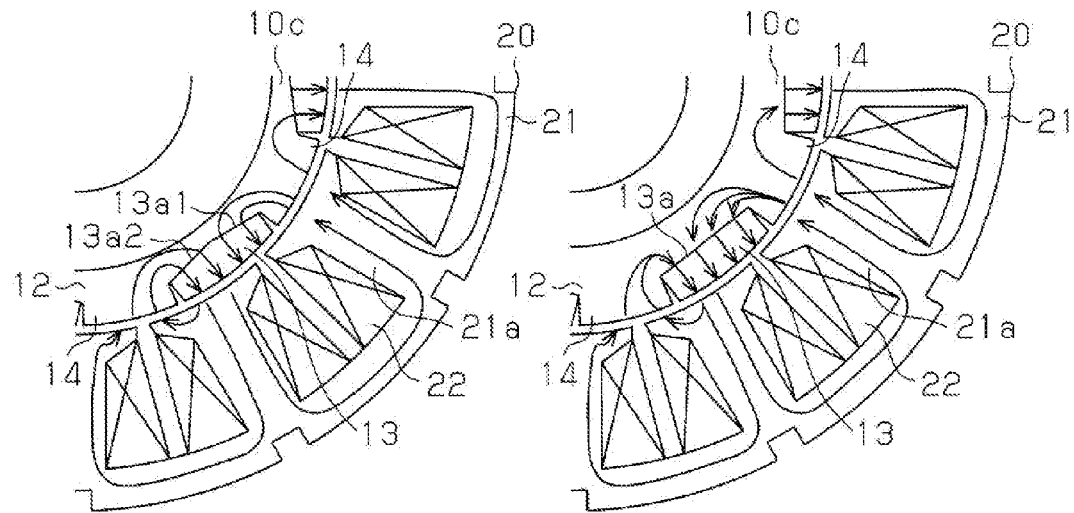
Fig.11
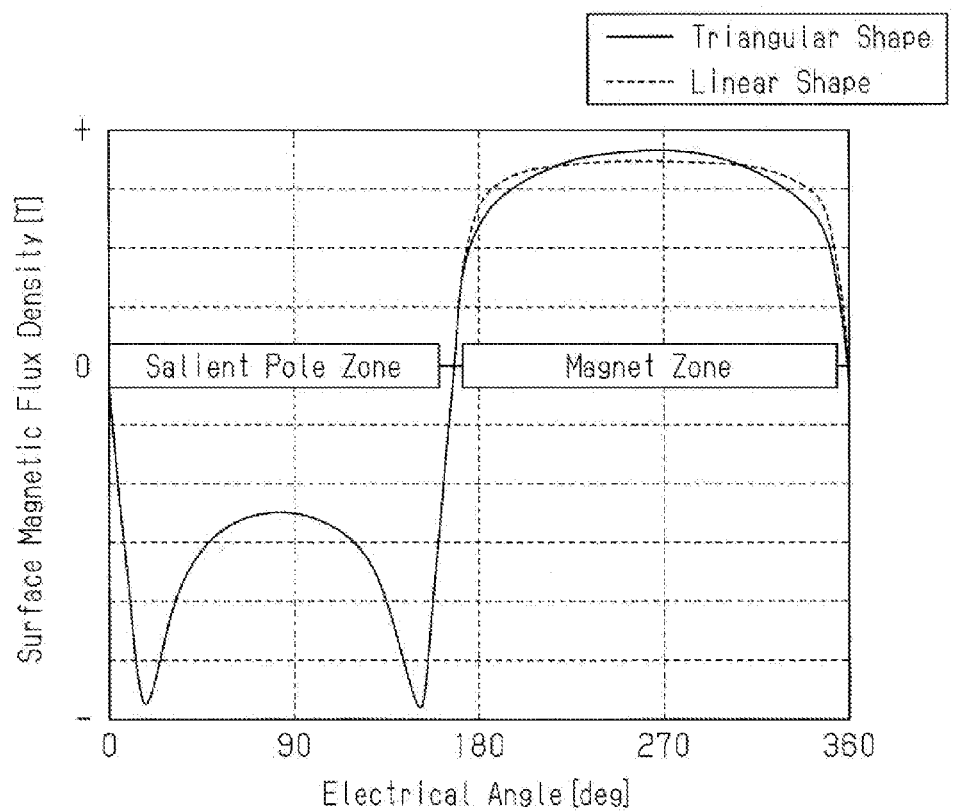

ROTOR AND MOTOR

The present invention relates to a rotor having a consequent-pole structure and a motor having such a rotor.

BACKGROUND OF THE INVENTION

For example, Japanese Laid-Open Patent Publication No. 9-327139 discloses a rotor having a consequent-pole structure as a rotor for a motor. The rotor of the above publication includes a rotor core, a plurality of magnets arranged along the circumferential direction of the rotor core, and a plurality of salient poles integrally formed with the rotor core. Each salient pole is located between a circumferentially adjacent pair of the magnets. The magnets function as either north poles or south poles, and the salient poles function as magnetic poles different from those of the magnets.

In a common rotor, in which all the magnetic poles are formed by magnets, magnetic flux flowing through a part of the rotor core close to the backside of each magnet is evenly divided at the center in the circumferential direction of the magnet to both sides in the circumferential direction. Accordingly, the rotor has a stable magnetic balance. In contrast, in the rotor having a consequent-pole structure of the above publication, the salient poles do not induce magnetic flux. Thus, depending on the ever-changing positional relationship between the salient poles and the teeth of the stator facing the salient poles, magnetic flux flowing through a part of the rotor core close to the backside of each magnet is not evenly divided between both sides in the circumferential direction from the circumferential center of the magnet. Instead, the magnetic flux flows in a greater amount through one of the salient poles at the circumferential ends of the magnet, which salient pole has a lower magnetic resistance. That is, since the directional property and the amount of magnetic flux at each salient pole change depending on the positional relationship between the salient pole and the teeth, the rotor become magnetically imbalanced. This deteriorates the rotational performance of the motor. Specifically, the torque may be lowered or the vibration may increase.

SUMMARY OF THE INVENTION

Accordingly, it is an objective of the present invention to provide a rotor that improves magnetic balance and rotational performance, and a motor having the rotor.

To achieve the above objectives and in accordance with a first aspect of the present invention, a rotor having a rotor core, magnets, and salient poles is provided. The magnets are arranged along the circumferential direction of the rotor core. Each magnet functions as a first magnetic pole. Each magnet has a backside facing the rotor core. The salient poles are integrally formed with the rotor core, so that each salient pole is located between a circumferentially adjacent pair of the magnets. Each salient pole functions as a second magnetic pole different from the first magnetic poles. The rotor core includes a magnetic flux dividing portion at each position that faces one of the magnets. Each magnetic flux dividing portion divides magnetic flux in the vicinity of the backside of the corresponding magnet to both sides in the circumferential direction.

In accordance with a second aspect of the present invention, a rotor having a rotor core, magnets, and salient poles is provided. The magnets are arranged along the circumferential direction of the rotor core. Each magnet functions as a first magnetic pole. Each magnet has a surface that is exposed to the outside. The salient poles are integrally formed with the rotor core, so that each salient pole is located between a circumferentially adjacent pair of the magnets. Each salient pole functions as a second magnetic pole different from the first magnetic poles. A space is formed between a circumferentially adjacent pair of the magnets and the corresponding salient pole. A slit is formed either in a distal surface of each salient pole or inside each salient pole.

In accordance with a third aspect of the present invention, a motor having a stator and a rotor is provided. The rotor includes a rotor core, magnets, and salient poles. The magnets are arranged along the circumferential direction of the rotor core. Each magnet functions as a first magnetic pole. Each magnet has a backside facing the rotor core. The salient poles are integrally formed with the rotor core, so that each salient pole is located between a circumferentially adjacent pair of the magnets. Each salient pole functions as a second magnetic pole different from the first magnetic poles. The rotor core includes a magnetic flux dividing portion at each position that faces one of the magnets. Each magnetic flux dividing portion divides magnetic flux in the vicinity of the backside of the corresponding magnet to both sides in the circumferential direction.

In accordance with a fourth aspect of the present invention, a motor having a stator and a rotor is provided. The rotor includes a rotor core, magnets, and salient poles. The magnets are arranged along the circumferential direction of the rotor core. Each magnet functions as a first magnetic pole. Each magnet has a surface that is exposed to the outside. The salient poles are integrally formed with the rotor core, so that each salient pole is located between a circumferentially adjacent pair of the magnets. Each salient pole functions as a second magnetic pole different from the first magnetic poles. A space is formed between a circumferentially adjacent pair of the magnets and the corresponding salient pole. A slit is formed either in a distal surface of each salient pole or inside each salient pole.

BRIEF DESCRIPTION OF THE DRAWINGS

FIG. 10A is a diagram for explaining the flow of magnetic flux when the inner surface of each magnet is formed to have a triangular cross section;

FIG. 10B is a diagram for explaining the flow of magnetic flux when the inner surface of each magnet is formed to have a linear cross section;

FIG. 11 is a graph showing the relationship between the electrical angle and the surface magnetic flux density in the motor shown in FIG. 9;

DESCRIPTION OF THE PREFERRED EMBODIMENTS

A first embodiment of the present invention will now be described with reference to the drawings.

Figure 1:
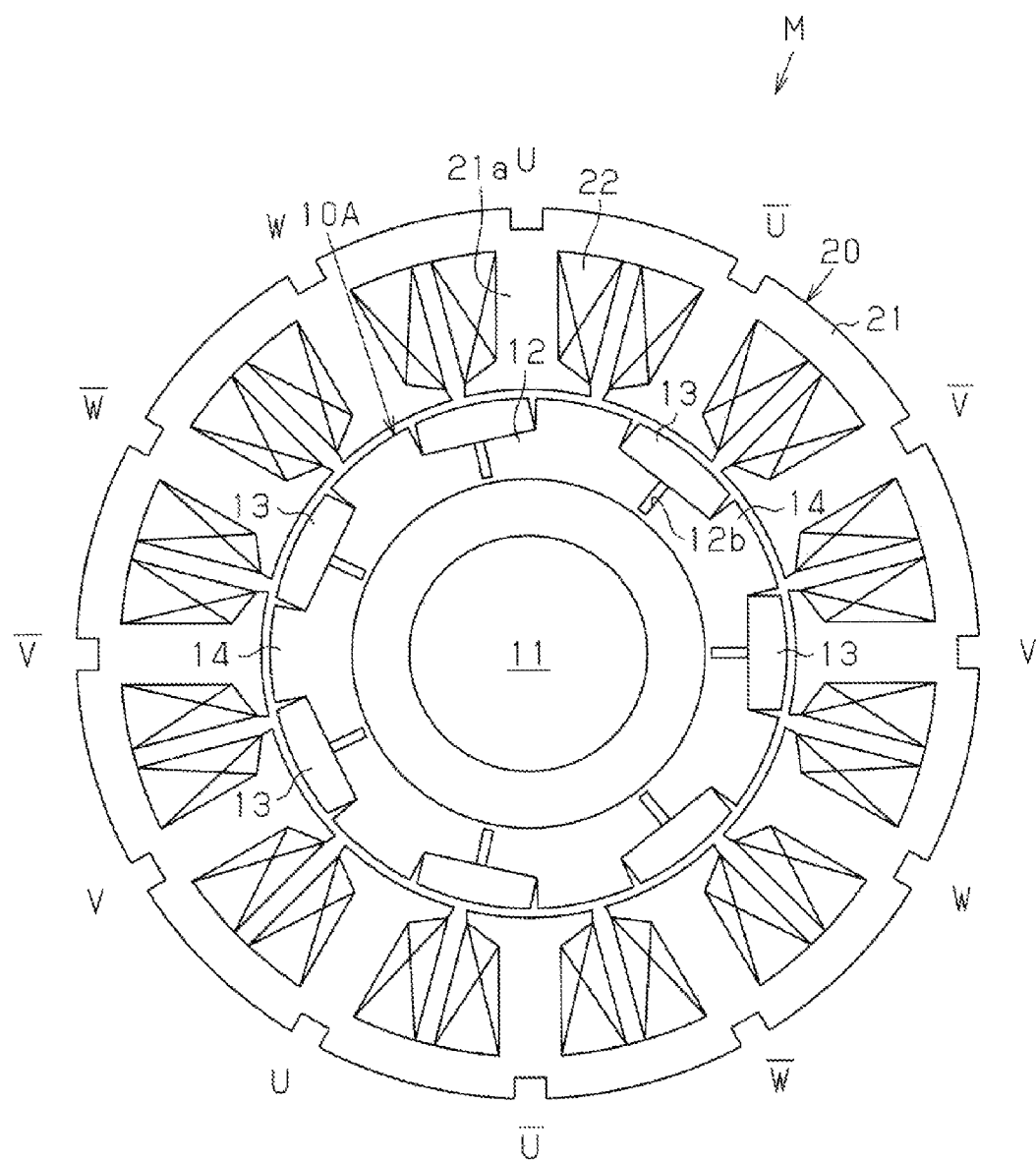
FIG. 1 is a plan view illustrating a motor according to a first embodiment of the present invention.
Figure 2:
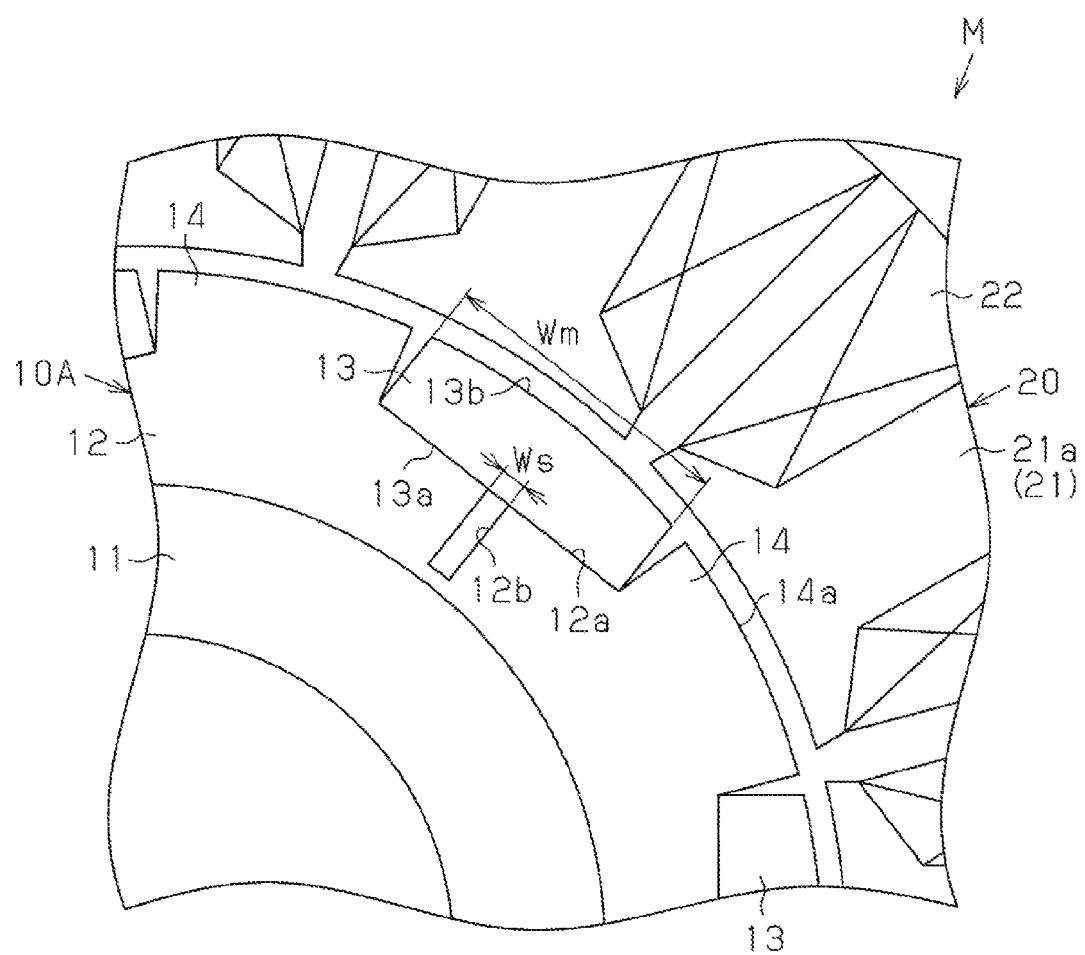
FIG. 2 is an enlarged partial view illustrating the motor shown in FIG. 1.

FIGS. 1 and 2 show an inner rotor brushless motor M. A rotor 10A is used in the motor M of the present embodiment. The rotor 10A includes a substantially annular rotor core 12, seven magnets 13, and seven salient poles 14. The rotor core 12 is made of magnetic metal and adhered to the outer circumferential surface of a rotary shaft 11. The magnets 13 are arranged on the outer circumferential surface of the rotor core 12 along the circumferential direction. Each salient pole 14 is located between a circumferentially adjacent pair of the magnets 13. The magnets 13 function as north poles. The salient poles 14 are integrally formed with the rotor core 12 and function as south poles. The rotor 10A is a consequent-pole rotor having fourteen magnetic poles. A stator 20 has a stator core 21 having twelve teeth 21a. A coil 22 is wound about each tooth 21a in a predetermined manner. That is, the stator 20 has twelve magnetic poles. The coils 22 are wound around the teeth 21a by concentrated winding. The coils 22 of the stator 20 are formed by a U-phase, a V-phase, and a W-phase. Forward winding and reverse winding are located side by side per each phase, such as in the order of a U-phase (forward winding), a $\overline{U}$-phase (reverse winding), a $\overline{V}$-phase, a V-phase, a W-phase, a $\overline{W}$-phase, a $\overline{U}$-phase, a U-phase, a V-phase, a $\overline{V}$-phase, a $\overline{W}$-phase, and a W-phase in the clockwise direction. The magnets 13 and the salient poles 14 are alternately arranged on the outer circumference of the rotor 10A in the circumferential direction at equal angular intervals.

The circumferential dimension of the magnets 13 is slightly greater than that of the salient poles 14. Each magnet 13 is substantially formed as a rectangular plate and has a flat inner surface 13a and a curved outer surface 13b. The inner surface 13a of each magnet 13 is adhered to an adherence surface (contact surface) 12a of the rotor core 12 that is formed between a circumferentially adjacent pair of the salient poles 14. Each adherence surface 12a is a flat surface perpendicular to a radial direction of the rotor core 12. The outer surface 13b of each magnet 13 is exposed on the radially outer side of the rotor core 12 so as to directly face the stator 20 (the teeth 21a). That is, the brushless motor M is an SPM motor.

The rotor core 12 has rectangular slits 12b, each of which extends radially inward from the circumferential center of an adherence surface 12a. Each slit 12b reaches the vicinity of the radially inner edge of the rotor core 12 such that the longitudinal direction of the slit 12b matches with the radial direction when viewed in the axial direction. Also, each slit 12b extends through the rotor core 12 in the axial direction. The slits 12b having such configurations function as magnetic resistance. Magnetic flux flowing through a part of the rotor core 12 close to the inner surface (backside, south pole) 13a of each magnet 13 is evenly divided at the circumferential center to both sides in the circumferential direction. The slits 12b thus function as magnetic flux dividing portions.

Each salient pole 14 has a shape that projects radially outward. Both circumferential end faces of each salient pole 14 are flat surfaces along the radial direction of the rotor core 12. Both circumferential end faces of each magnet 13 are flat surfaces parallel to a radial straight line that passes through the circumferential center of the magnet 13 and the axis of the rotary shaft 11. Thus, between each salient pole 14 and the circumferentially adjacent magnet 13, a clearance having a triangular cross section is formed so that these do not contact each other in the circumferential direction. The outer surface 14a of each salient pole 14 is curved and is located on the same circumference as the outer surface 13b of the magnets 13. A clearance exists between the outer surfaces 13b, 14a of the magnets 13 and the salient poles 14 and the radially inner ends of the teeth 21a of the stator 20.

If the ratio Ws/Wm of the width (circumferential dimension) Ws of the slits 12b and the width (circumferential dimension) Wm of the magnets 13 is changed, the torque of the motor M and the radial force, which is a cause of vibration, are changed. The torque and the radial force in relation to the ratio Ws/Wm were measured.

Figure 3:
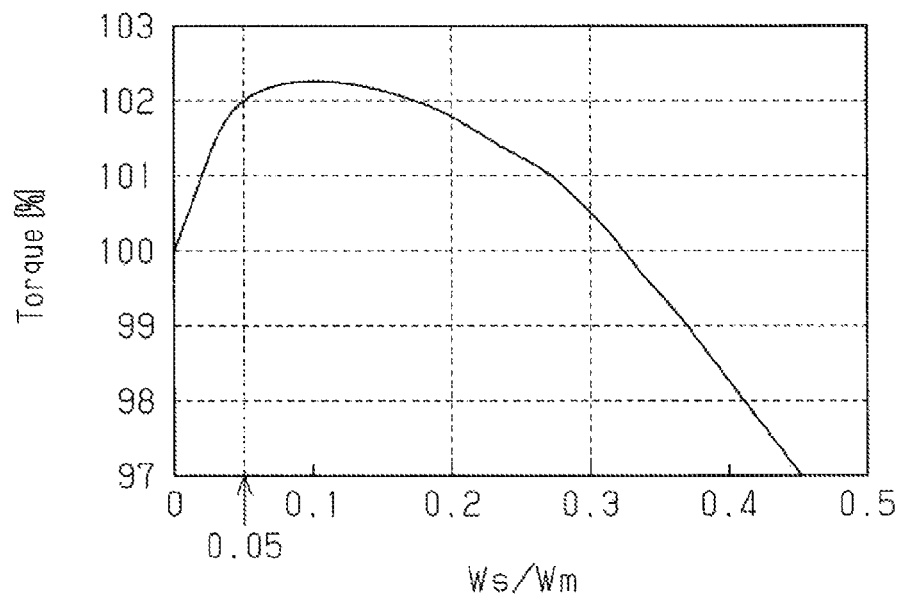
FIG. 3 is a graph showing the relationship between the ratio Ws/Wm and the torque of the motor shown in FIG. 1.

FIG. 3 shows the torque of the motor M when the ratio Ws/Wm was changed. The torque when the ratio Ws/Wm was zero, that is, when no slits 12b were provided, was set as 100%. In this case, the torque gradually increased as the ratio Ws/Wm increased from zero. The torque had the maximum value, or approximately 102.3%, when the ratio Ws/Wm was 0.1. As the ratio Ws/Wm increased further, the torque gradually decreased. When the ratio Ws/Wm was 0.2, the torque was approximately 101.8%. When the ratio Ws/Wm was 0.3, the torque was approximately 100.5%. With reference to FIG. 3, sufficient torque over 100% was obtained in the range where 0<Ws/Wm≦0.3. It is therefore preferable that the ratio Ws/Wm be set in this range. The range where 0.05≦Ws/Wm≦0.2 is particularly preferable since the torque was significantly great in this range.

Figure 4:
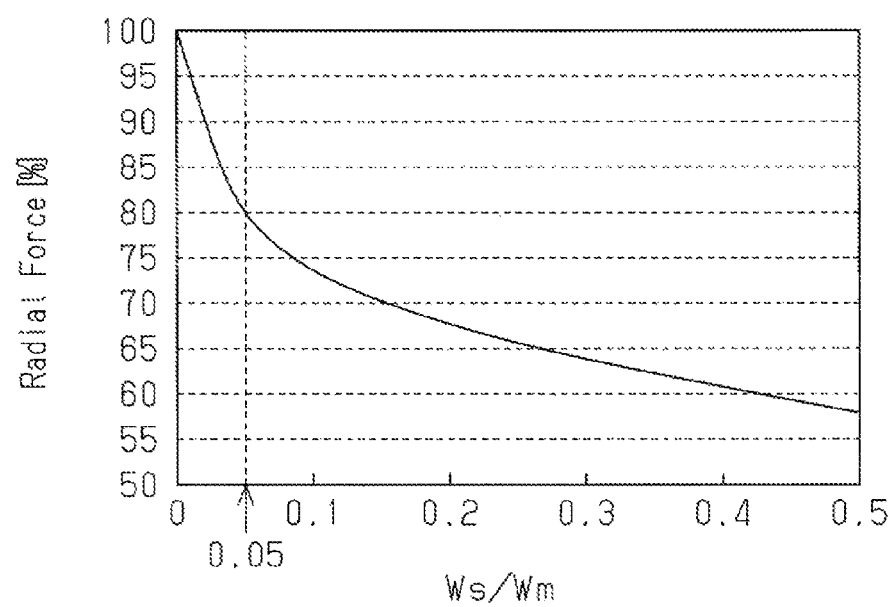
FIG. 4 is a graph showing the relationship between the ratio Ws/Wm and the radial force of the motor shown in FIG. 1.

FIG. 4 shows the radial force of the motor M when the ratio Ws/Wm was changed. The radial force when the ratio Ws/Wm was zero, that is, when no slits 12b were provided, was set as 100%. As the ratio Ws/Wm increased from zero, the radial force gradually decreased. When the ratio Ws/Wm was 0.05, the radial force was approximately 80%. When the ratio Ws/Wm was 0.1, the radial force was approximately 74%. When the ratio Ws/Wm was 0.2, the radial force was approximately 67%. When the ratio Ws/Wm was 0.3, the radial force was approximately 64%. With reference to FIG. 4, the radial force was sufficiently reduced (to approximately 80%) in the range where 0.05≦Ws/Wm. It is therefore preferable that the ratio Ws/Wm be set in this range.

Taking the above results into consideration, the ratio Ws/Wm of the width Ws of the slits 12b and the width Wm of the magnets 13 is set in the range where 0<Ws/Wm≦0.3. That is, a slit 12b is formed in each part of the rotor core 12 that faces the inner surface 13a of the corresponding magnet 13. This improves the flow of magnetic flux at the part of the rotor core 12 in the vicinity of the inner surface 13a, thus improving the flow of magnetic flux in the entire magnetic circuit of the rotor 10A, while optimizing the shape and size of the slits 12b. Accordingly, the torque is improved and the vibration is reduced due to the reduced radial force. This improves the rotational performance of the motor M.

The present embodiment has the following advantages.

(1) In the rotor 10A according to the present embodiment, a slit 12b is formed in each part of the rotor core 12 in the vicinity of the inner surface (backside) 13a of the corresponding magnet 13. The slit 12b functions as a magnetic flux dividing portion that forcibly and evenly divides magnetic flux to both sides in the circumferential direction. That is, the slits 12b reliably prevent magnetic imbalance from being created by the existence of the salient poles 14, which do not induce magnetic flux. This improves the magnetic balance of the rotor 10A, improving the rotational performance. Specifically, the torque is improved and the vibration is reduced. Also, in the present embodiment, the shape and size of the slit 12b are optimized, so that the rotational performance is reliably improved.

(2) Since the slits 12b formed in the rotor core 12 function as magnetic flux dividing portions in the present embodiment, the magnetic flux dividing portions are easily formed, and no additional components are required.

(3) Since the slits 12b are each formed in a part of the rotor core 12 near the inner surface (backside) 13a of the corresponding magnet 13 in the present embodiment, the magnetic flux flowing through a part of the rotor core 12 near the inner surface (backside) 13a is evenly divided in a reliable manner.

A second embodiment of the present invention will now be described with reference to FIGS. 5 to 8.

Figure 5:
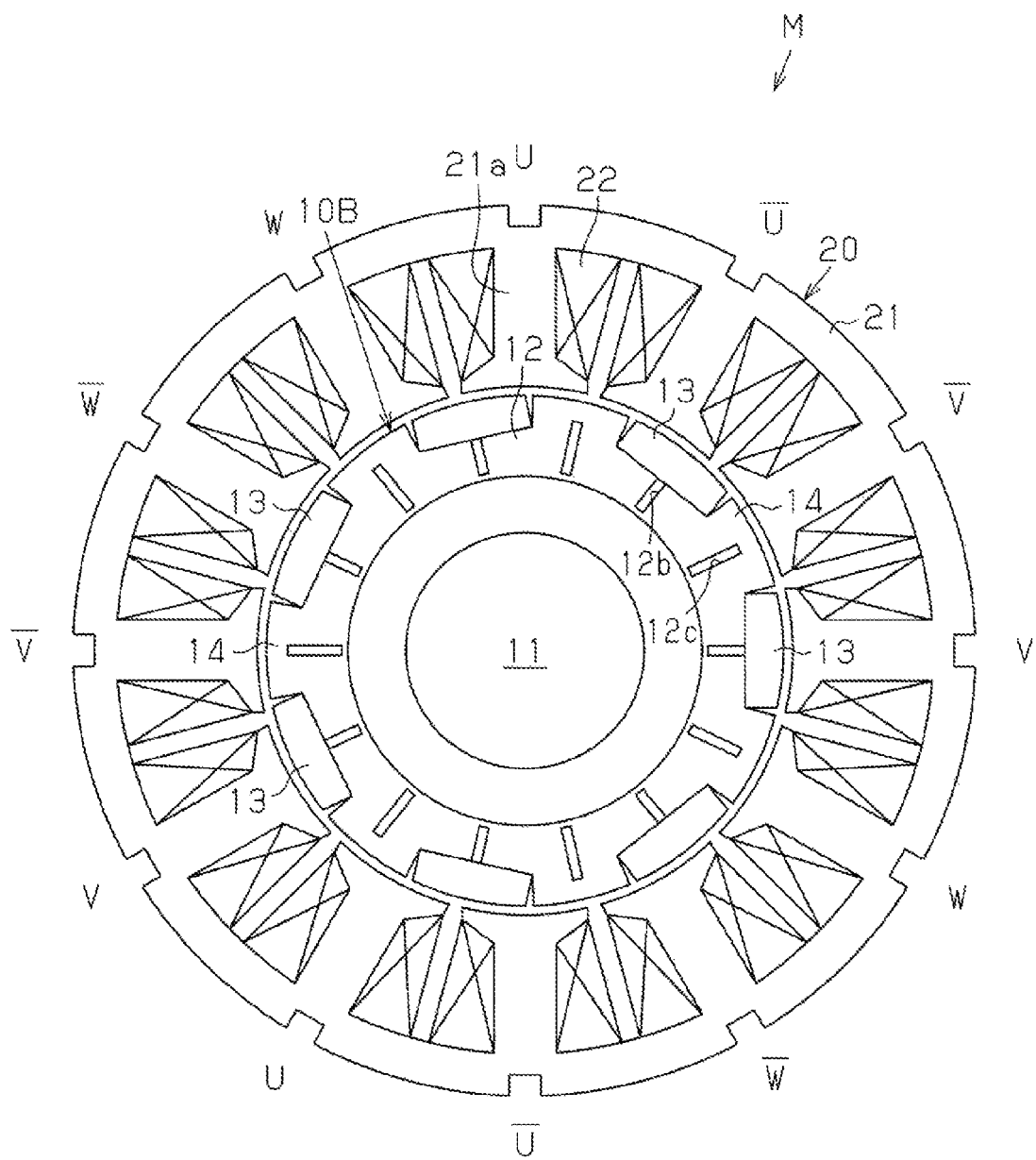
FIG. 5 is a plan view illustrating a motor according to a second embodiment of the present invention.
Figure 6:
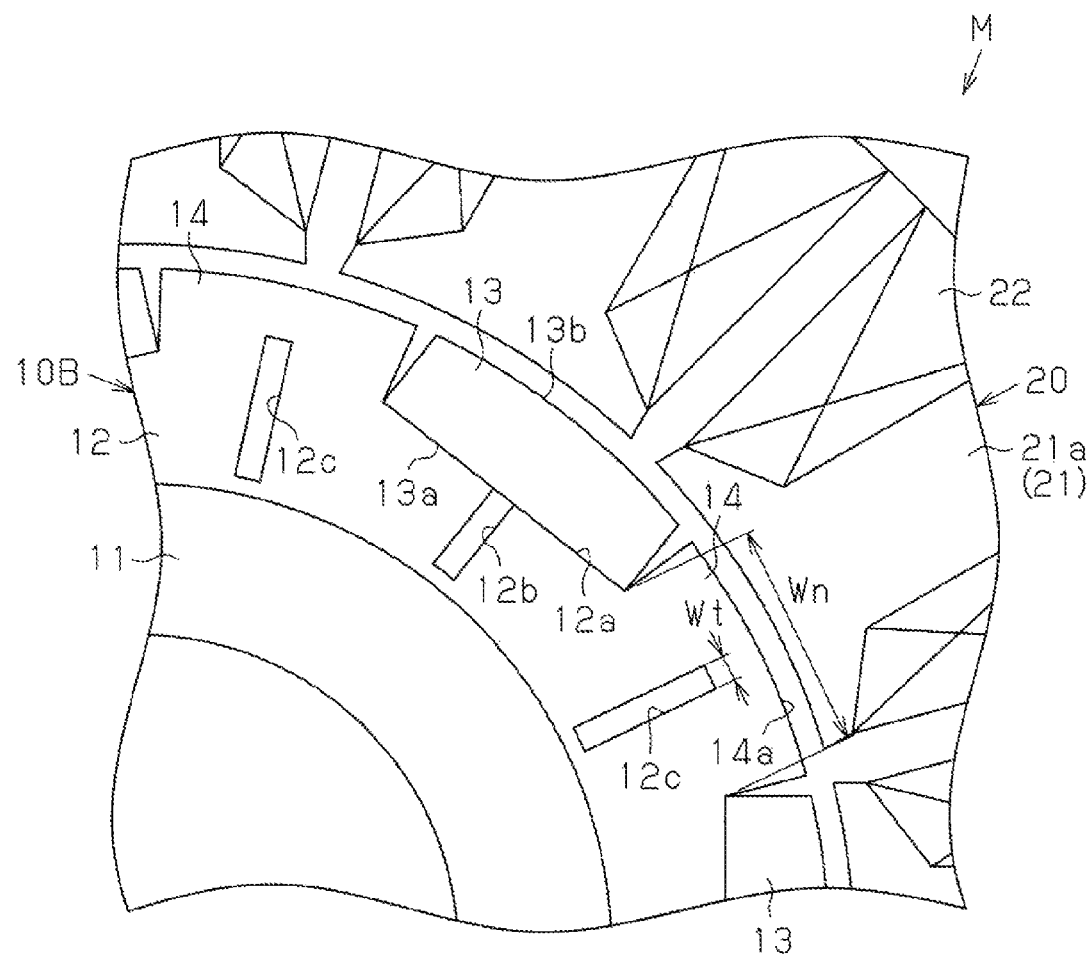
FIG. 6 is an enlarged partial view illustrating the motor shown in FIG. 5.

As shown in FIGS. 5 and 6, a rotor core 12 used in a rotor 10B of the present embodiment has a slit 12c in each salient pole 14 in addition to the slits 12b of the first embodiment. The slit 12c is located at the center in the circumferential direction in the corresponding salient pole 14, and has a rectangular shape that extends along the radial direction of the rotor core 12. Like the slits 12b, the radially inner end of each slit 12c reaches the vicinity of the radially inner edge of the rotor core 12 when viewed in the axial direction. The radially outer end of each slit 12c is located at the center in the radial direction in the corresponding salient pole 14. That is, each slit 12c extends from the vicinity of the inner edge of the rotor core 12 to a position that is radially outward of the proximal end of the corresponding salient pole 14. Also, each slit 12c extends through the rotor core 12 in the axial direction. The slits 12c function as magnetic resistance, and thus function as magnetic flux straightening portions, which cause the magnetic flux through the salient pole 14 to direct in the radial direction.

If the ratio Wt/Wm of the width (circumferential dimension) Wt of the slits 12c and the width (circumferential dimension) Wn of the salient poles 14 is changed, the torque of the motor M and the radial force, which is a cause of vibration, are changed. The torque and the radial force in relation to the ratio Wt/Wn were measured.

Figure 7:
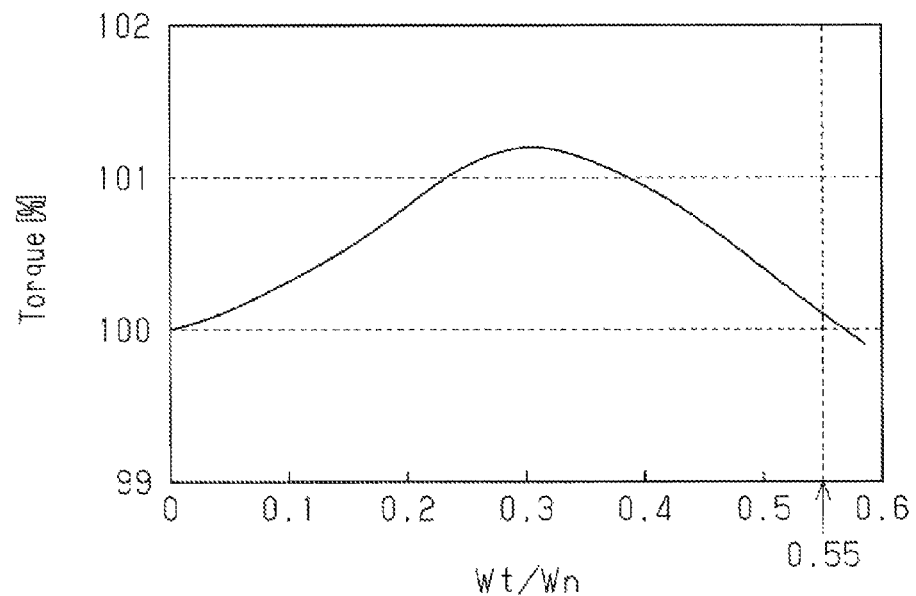
FIG. 7 is a graph showing the relationship between the ratio Wt/Wn and the torque of the motor shown in FIG. 5.

FIG. 7 shows the torque of the motor M when the ratio Wt/Wn was changed. The torque when the ratio Wt/Wn was zero, that is, when no slits 12c were provided, was set as 100%. In this case, the torque gradually increased as the ratio Wt/Wn increased from zero. The torque had the maximum value, or approximately 101.2%, when the ratio Wt/Wn was 0.3. The torque gradually decreased as the ratio Wt/Wn increased further. The torque was approximately 100.1%, when the ratio Wt/Wn was 0.55. With reference to FIG. 7, a sufficient torque over 100% was obtained in the range where $0 < Wt/Wn \leq 0.55$. It is therefore preferable that the ratio Wt/Wn be set in this range. It is particularly preferable to set the ratio Wt/Wn at about 0.3, since the torque is particularly increased in this range.

Figure 8:
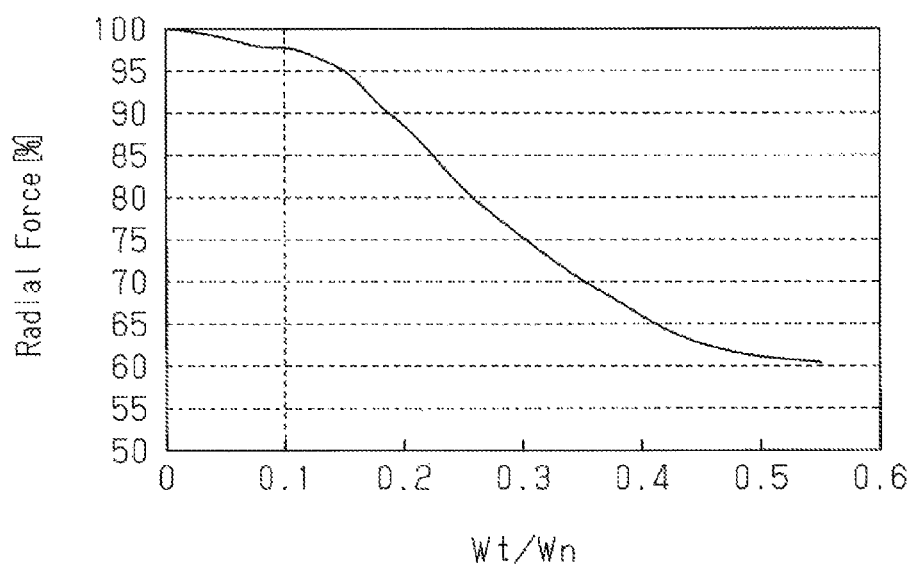
FIG. 8 is a graph showing the relationship between the ratio Wt/Wn and the radial force of the motor shown in FIG. 5.
Figure 9:
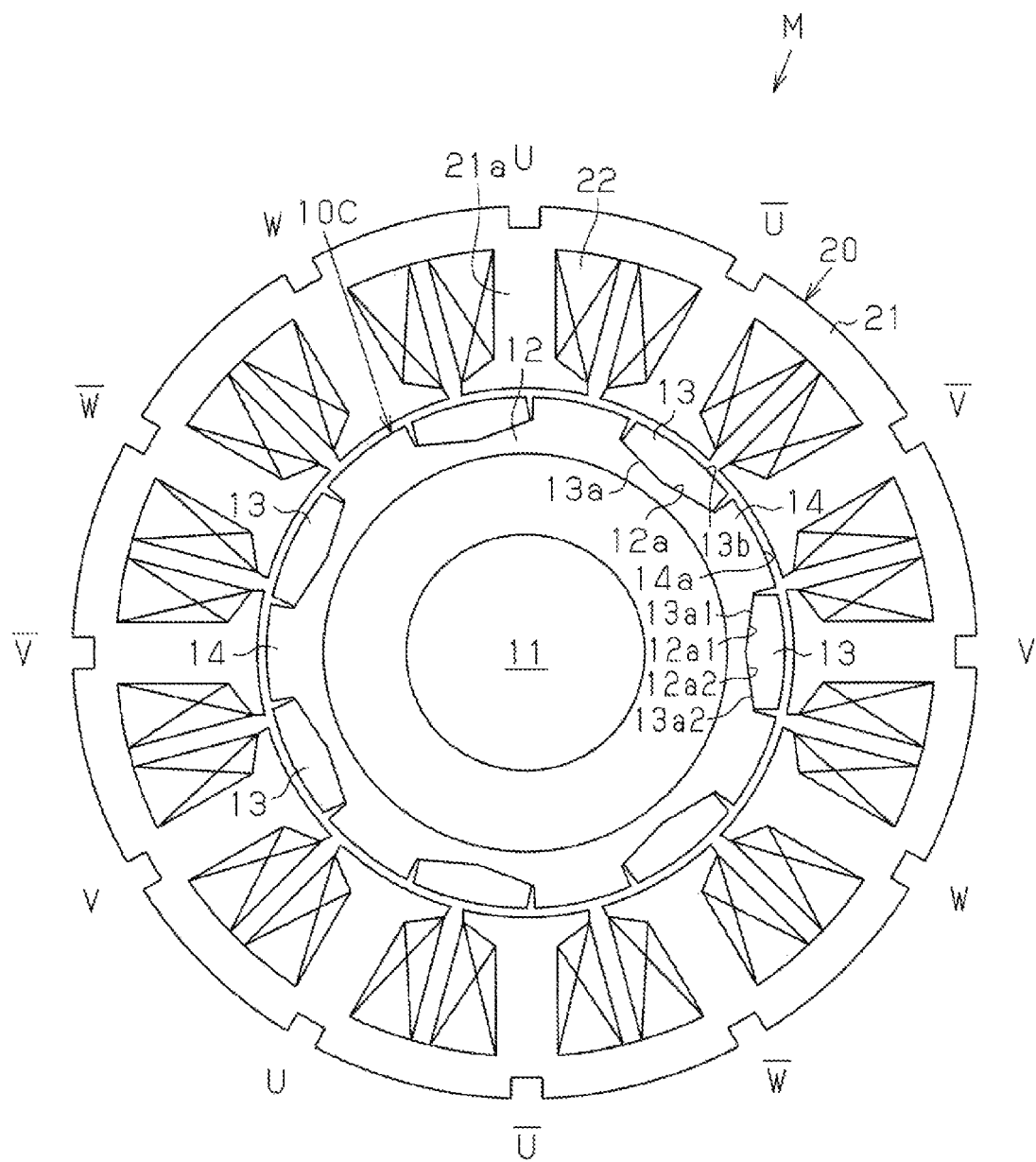
FIG. 9 is a plan view illustrating a motor according to a third embodiment of the present invention.

FIG. 8 shows the radial force of the motor M when the ratio Wt/Wn was changed. The radial force when the ratio Wt/Wn was zero, that is, when no slits 12c were provided, was set as 100%. As the ratio Wt/Wn increased from zero, the radial force gradually decreased. When the ratio Wt/Wn was 0.1, the radial force was approximately 98%. When the ratio Wt/Wn was 0.3, the radial force was approximately 75%. When the ratio Wt/Wn was 0.55, the radial force was approximately 60%. With reference to FIG. 8, the radial force was reduced in the range where $0.1 \leq Wt/Wn$. It is therefore preferable that the ratio Wt/Wn be set in this range.

Taking the above results into consideration, the ratio Wt/Wn of the width Wt of the slit 12c and the width Wn of the salient pole 14 is set in the range where $0.1 \leq Wt/Wn \leq 0.55$. That is, in addition to the slits 12b, each of which is formed at a part of the rotor core 12 that faces the inner surface 13a of the corresponding magnet 13, a slit 12c is formed in each salient pole 14. This improves the flow of magnetic flux at the salient poles 14, while improving the flow of magnetic flux in a part of the rotor core 12 in the vicinity of the inner surface 13a, thus improving the flow of magnetic flux in the entire magnetic circuit of the rotor 10B. Also, by optimizing the shape and size of the slit 12c, the torque is improved and the vibration is reduced due to the reduced radial force. This improves the rotational performance of the motor M.

The present embodiment has the following advantages.

(4) The rotor 10B according to the present embodiment provides the same advantages as the advantages (1) to (3) of the first embodiment.

(5) In the present embodiment, each salient pole 14 has a slit 12c formed therein, and the slit 12c functions as a magnetic flux straightening portion, which forcibly changes the direction of the magnetic flux through the interior of the salient pole 14. This optimizes the flow of magnetic flux in each salient pole 14, thereby improving the magnetic balance and the rotational performance of the rotor 10B. Also, in the present embodiment, the shape and size of the slit 12c are optimized, so that the rotational performance is reliably improved.

A third embodiment of the present invention will now be described with reference to FIGS. 9 to 13. In a rotor 10C according to the present embodiment, each adherence surface 12a of the rotor core 12, to which a magnet 13 is adhered, is formed to be V-shaped, so that its circumferential center is recessed radially inward. That is, each adherence surface 12a has a pair of inclined surfaces 12a1, 12a2, which extend away from each other in the circumferential direction from the circumferential center of the adherence surface 12a. In accordance with the inclined surfaces 12a1, 12a2, the inner surface 13a of each magnet 13 is formed to be triangular such that its circumferential center projects radially inward. Each inner surface 13a is formed by a pair of inclined surfaces 13a1, 13a2, which extend away from each other in the circumferential direction from the circumferential center of the inner surface 13a. The inclined surfaces 13a1, 13a2 of each magnet 13 are brought into surface contact with and adhered to the corresponding inclined surfaces 12a1, 12a2 of the rotor core 12. At this time, the position of the magnet 13 is easily determined.

As shown in FIG. 10A, each pair of the inclined surfaces 12a1, 12a2 evenly divides magnetic flux flowing through a part of the rotor core 12 in the vicinity of the inner surface (the backside; the south pole) 13a of the corresponding magnet 13, from the circumferential center of the magnet 13 to both sides in the circumferential direction. Therefore, the pair of inclined surfaces 12a1, 12a2 functions as a magnetic flux dividing portion, so as to improve the flow of magnetic flux through the entire magnetic circuit. For comparison, FIG. 10B shows a case where the adherence surface 12a of the rotor core 12 has a linear cross-section. In this case, the magnetic flux flowing through a part of the rotor core 12 in the vicinity of the inner surface (backside) 13a of the magnet 13 is not evenly divided at the circumferential center to both sides in the circumferential direction. This may increase torque pulsation, which is a cause of vibration.

The thickness at each circumferential end of each magnet 13 according to the present embodiment, which has the inner surface 13a formed to project radially inward, is less than that in its circumferential center. Therefore, as shown in FIG. 11, the magnetic flux density is prevented from abruptly changing at each circumferential end of the outer surface 13b of each magnet 13. In FIG. 11, the solid line represents changes in the magnetic flux density on the surface of each magnet 13 of the rotor 10C shown in FIG. 10A, and the broken line represents changes in the magnetic flux density on the surface of the magnet 13 of the rotor 10C shown in FIG. 10B. That is, changes in the magnetic flux density on the surface of each magnet 13 approximates a sine wave. This reduces torque pulsation.

Figure 12:
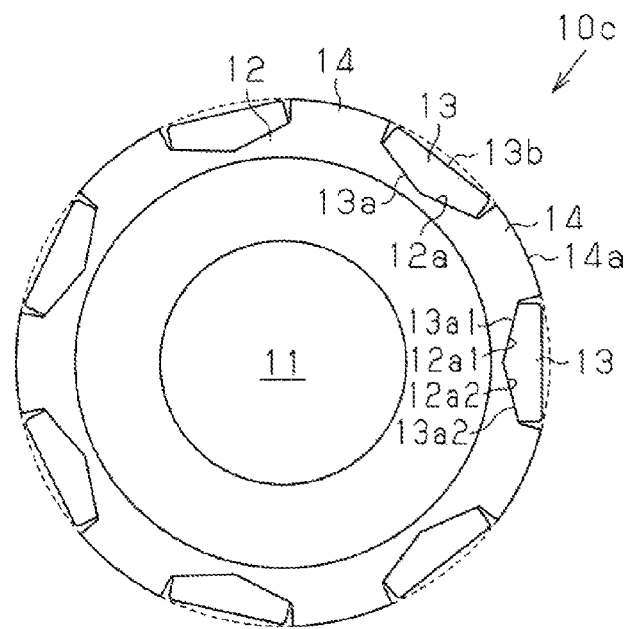
FIG. 12 is a plan view illustrating a rotor according to a modification of the third embodiment.

In the above embodiment, the outer surface 13b of each magnet 13 is formed as a curved surface on the same circumference as the outer surfaces 14a of the salient poles 14. However, as shown in FIG. 12, the outer surface 13b of each magnet 13 may be formed to be flat and located radially inward of the outer surfaces 14a of the salient poles 14. This configuration reduces the material for making the magnets 13 and simplifies the shape of the magnets 13. Accordingly, the costs for the magnets 13 are reduced.

Figure 13:
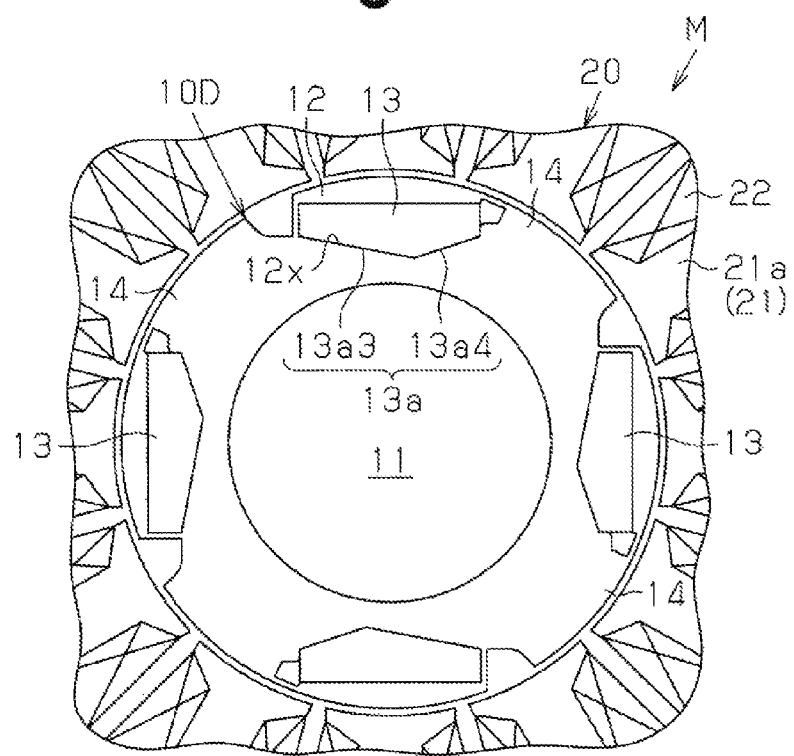
FIG. 13 is a plan view illustrating a rotor according to a modification of the third embodiment.

The rotor 10C according to the present embodiment has an SPM structure, in which the outer surface 13b of each magnet 13 is exposed to the radially outside. However, an IPM structure may be employed, in which a plurality of insertion holes 12x are formed in the rotor core 12 and arranged along the circumferential direction, and the magnet 13 is inserted into each insertion hole 12x as shown in FIG. 13. The number of the magnets 13 is four in this case, and the number of the salient poles 14, which are consequent poles, is also four. The rotor 10D thus has eight magnetic poles.

Also, the radially innermost part of the inner surface 13a of each magnet 13 (the vertex of the triangular shape) may be shifted as shown in FIG. 13, so as to adjust the sizes of inclined surfaces 13a3, 13a4. This allows the flow of magnetic flux of the magnetic circuit in the rotor 10D to be optimized.

The present embodiment has the following advantages.

(6) In the rotors 10C, 10D of the present embodiment, a pair of the inclined surfaces 12a1, 12a2 forming each adherence surface 12a of the rotor core 12 function as a magnetic flux dividing portion. This changes the direction of magnetic flux at each of the inclined surfaces 12a1, 12a2, so that the magnetic flux at each part of the rotor core 12 that faces the inner surface (backside) 13a of the corresponding magnet 13 is divided in a desirable manner.

(7) In the present embodiment, the inner surface (backside) 13a of each magnet 13 is formed to project radially inward. This simplifies the shape of the inner surface 13a of each magnet 13, thereby facilitating the manufacture of the magnets 13.

A fourth embodiment of the present invention will now be described with reference to FIGS. 14 to 23.

Figure 14:
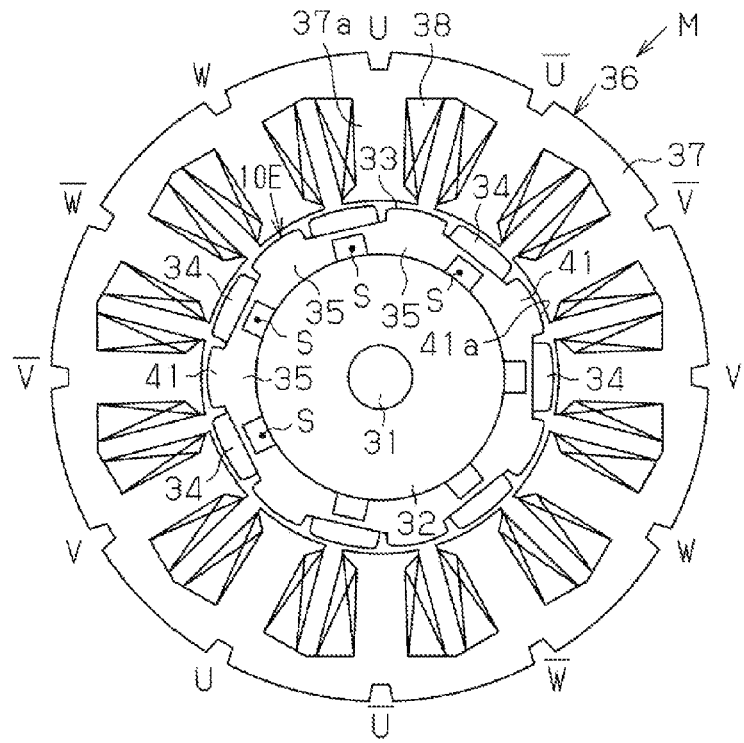
FIG. 14 is a plan view illustrating a motor according to a fourth embodiment.
Figure 15:
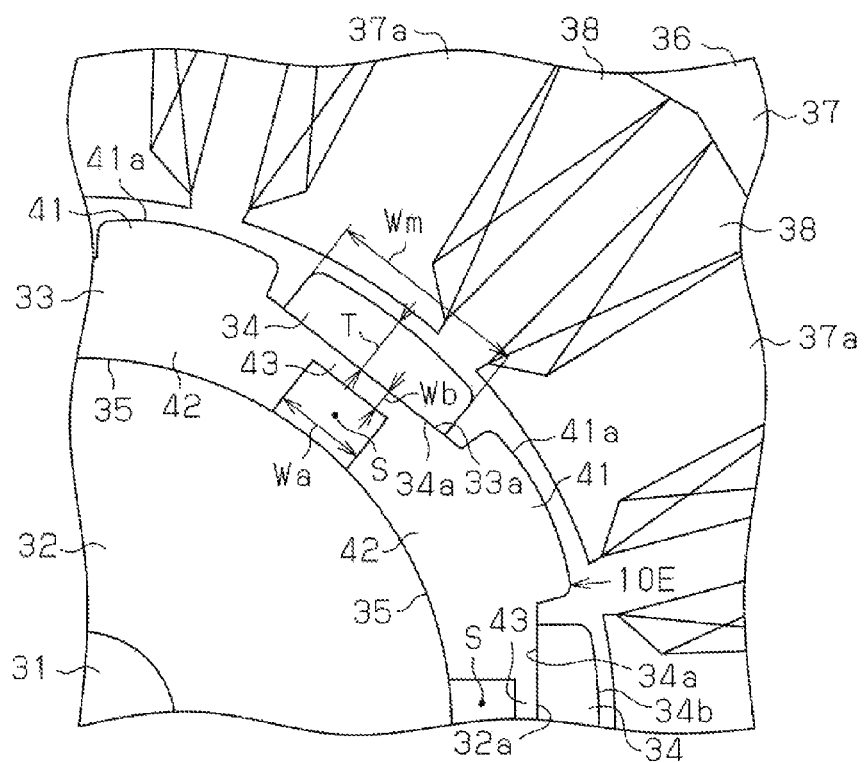
FIG. 15 is an enlarged partial view illustrating the motor shown in FIG. 14.
Figure 16:
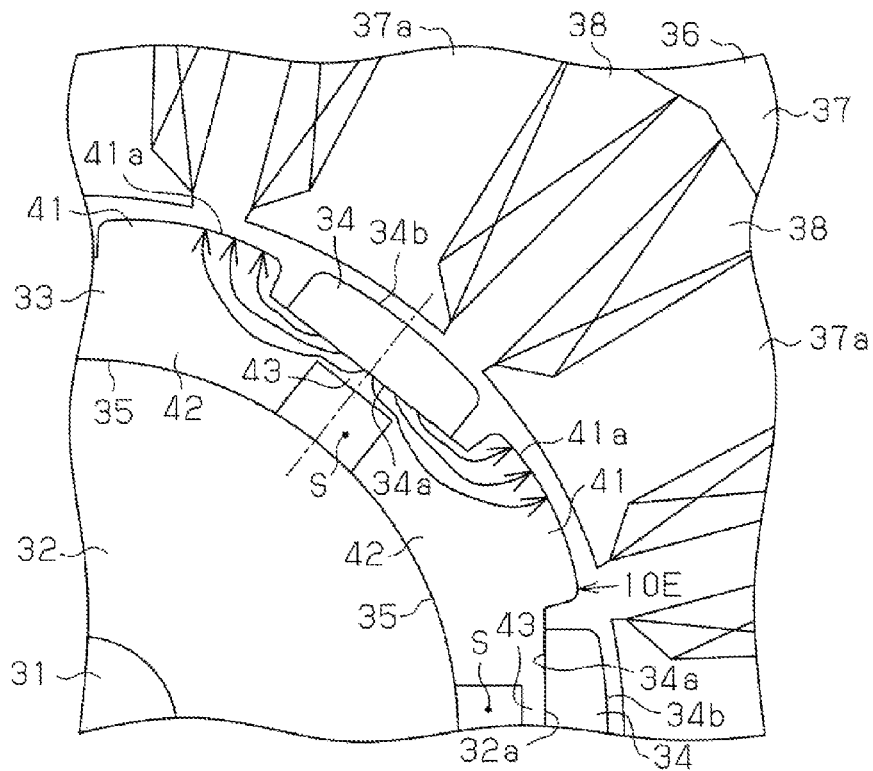
FIG. 16 is a diagram for explaining the flow of magnetic flux in the motor shown in FIG. 14.

FIGS. 14 and 15 show an inner rotor brushless motor M. As shown in FIG. 14, a rotor 10E is used in the motor M of the present embodiment. The rotor 10E includes an annular nonmagnetic portion 32, a substantially annular rotor core 33, seven magnets 34, and seven salient pole blocks 14. The nonmagnetic portion 32 is made of a nonmagnetic material (for example, aluminum) and is fixed to the outer circumferential surface of a rotary shaft 31. The rotor core 33 is made of magnetic metal and adhered to the outer circumferential surface of the nonmagnetic portion 32. The magnets 34 are arranged on the outer circumference of the rotor core 33 along the circumferential direction. Each salient pole block 35 is located between a circumferentially adjacent pair of the magnets 34. The magnets 34 function as south poles. The salient pole blocks 35 are integrally formed with the rotor core 33. Each salient pole block 35 includes a salient pole 41 projecting radially outward and a base 42 located radially inward of the salient pole 41. Each salient pole 41 has a sectoral cross-section when viewed in the axial direction. The salient poles 41 function as north poles. That is, the magnets 34 and the salient poles 41 are alternately arranged on the outer circumference of the rotor 10E in the circumferential direction at equal angular intervals. In the present embodiment, each salient pole 41 arranged at a position spaced by 180° from one of the magnets 34. The rotor 10E is a consequent-pole rotor having fourteen magnetic poles. A stator core 37 has twelve teeth 37a. A coil 38 is wound about each tooth 37a in a predetermined manner. That is, the stator 36 has twelve magnetic poles.

The circumferential dimension of the magnets 34 is slightly greater than that of the salient poles 41. Each magnet 34 is substantially formed as a quadrangular prism, and has a flat inner surface 34a and a curved outer surface 34b. The inner surface 34a of each magnet 34 is adhered to an adherence surface (contact surface) 33a of the rotor core 33 that is formed between a circumferentially adjacent pair of the salient poles 41. Each adherence surface 33a is a flat surface perpendicular to a radial direction of the rotor core 33. Between each salient pole 41 and the circumferentially adjacent magnet 34, a clearance is formed so that these do not contact each other in the circumferential direction. The outer surfaces 34b of the magnets 34 are located on the same circumference.

The salient pole blocks 35 of the rotor core 33 are arranged in the circumferential direction at equal angular intervals. Each salient pole block 35 is formed such that the salient pole 41 projects radially outward from the circumferential center of the base 42. That is, the circumferential dimension of the base 42 is greater than that of the salient pole 41. Each salient pole block 35 is symmetrical with respect to a line that passes through the circumferential center thereof and extends along the radial direction. The circumferential ends of each base 42 extend to positions facing the radially inner side of a circumferentially adjacent pair of the magnets 34 and contacts the inner surfaces 34a of the magnets 34.

A space S is formed at a part of the rotor core 33 that faces the inner surface 34a of each magnet 34. The space S is located between the bases 42 of circumferentially adjacent pair of the salient blocks 35 and functions as a magnetic flux dividing portion. Each circumferential end of each base 42 is spaced by a predetermined distance from the base 42 of the circumferentially adjacent salient block 35. The spaces S are formed in the inner circumferential surface of the rotor core 33 and extend through the rotor core 33 along the axial direction.

Each space S is formed such that a radial line that passes through its circumferential center coincides with a radial line that passes through the circumferential center of the corresponding magnet 34. Each space S is formed such that its circumferential width Wa is constant along the radial direction. In the present embodiment, the space S is a void. The salient pole blocks 35 of each circumferentially adjacent pair are connected to each other by a coupling portion 43 located between the corresponding space S and the corresponding adherence surface 33a of the rotor core 33.

The coupling portions 43 are formed integrally with the salient pole blocks 35. Each coupling portion 43 is formed to couple the radially outer ends of the base portions 42 of circumferentially adjacent pair of the salient blocks 35. The outer surface of each coupling portion 43 and the outer surfaces of the adjacent base portions 42 form a flat adherence surface 33a, to which the magnet 34 is adhered. That is, the rotor core 33 shown in FIGS. 14 and 15 is arranged such that the outer surface of each coupling portion 43 contacts the inner surface 34a of the magnet 34. Not only the outer surface, but also the inner surface of each coupling portion 43 is flat, so that the thickness (the radial dimension) of the coupling portion 43 is constant.

The outer surface 41a of each salient pole 41 is curved. Specifically, the outer surface 41a of each salient pole 41 is formed to have a curved shape such that its circumferential center portion protrudes radially outward relative to the circumferential ends. In other words, each salient pole 41 is curved such that it retreats radially inward toward the circumferential ends from the circumferential center. Each outer surface 41a has a constant curvature and is symmetrical with respect to a radial line that passes through the circumferential center. Also, the outer surface 41a of each salient pole 41 is located radially inward of the outer surface 34b of each magnet 34.

In such a motor M, magnetic flux flowing through a part of the rotor core 33 that faces the inner surface 34a of each magnet 34 is evenly divided by the space S to both sides in the circumferential direction at the circumferential center of the magnet 34. The coupling portion 43 of the present embodiment contacts the inner surface 34a of the magnet 34, so as to be magnetically saturated with the magnetic flux in the vicinity of the inner surface 34a. In a case where each coupling portion 43 is formed at a position slightly spaced radially inward from the inner surface 34a of the magnet 34, the coupling portion 43 is magnetically saturated with the magnetic flux in the vicinity of the inner surface 34a of the magnet 34. However, if each coupling portion 43 is not formed at a position that is not sufficiently far away in the radially inward direction from the inner surfaces 34a of the corresponding magnets 34 (for example, if each coupling portion 43 is located at the radially inner end of the base 42), the coupling portion 43 is not magnetically saturated. In a state where the coupling portions 43 are not magnetically saturated, some of the magnetic flux that should pass one of circumferentially adjacent pair of the salient pole blocks 35 flows to the other salient pole block 35 through the coupling portion 43, depending on the positional relationship between the magnets 34 and the teeth 37a. In contrast, according to the present embodiment, each coupling portion 43 contacts the inner surface 34a of the corresponding magnet 34, so that the coupling portion 43 is magnetically saturated. Therefore, the magnetic flux that passes through the coupling portion 43 is evenly divided between both sides in the circumferential direction at the circumferential center. Therefore, unlike the above described case, magnetic flux is prevented from flowing through only one of an adjacent pair of the salient pole blocks 35. Accordingly, the magnetic flux in the vicinity of the inner surface 34a of each magnet 34 can always be evenly divided between both sides in the circumferential direction at the circumferential center regardless of the positional relationship between the teeth 37a and the magnets 34. This improves the magnetic balance of the rotor 10A, improving the rotational performance. Specifically, the torque is improved and the vibration is reduced.

Figure 17:
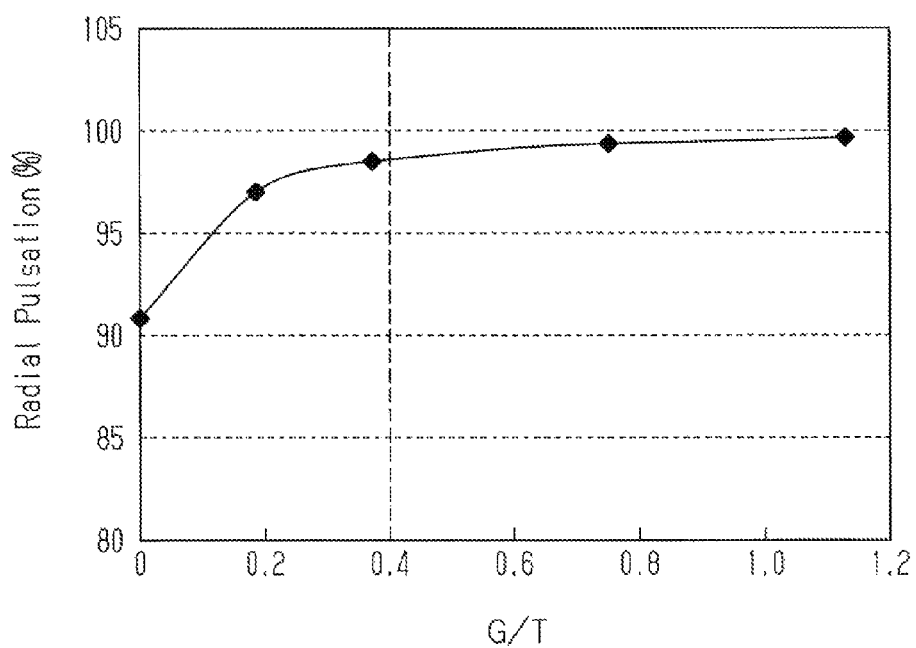
FIG. 17 is a graph showing the relationship between the ratio G/T and the radial pulsation of the motor shown in FIG. 14.
Figure 18:
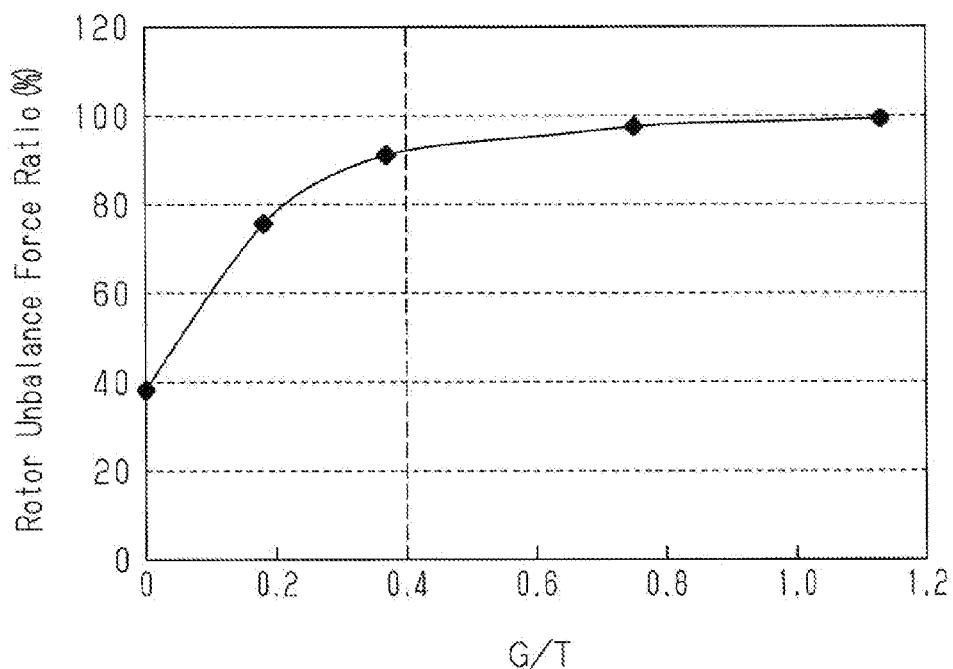
FIG. 18 is a graph showing the relationship between the ratio G/T and the rotor unbalance force of the motor shown in FIG. 14.
Figure 19:
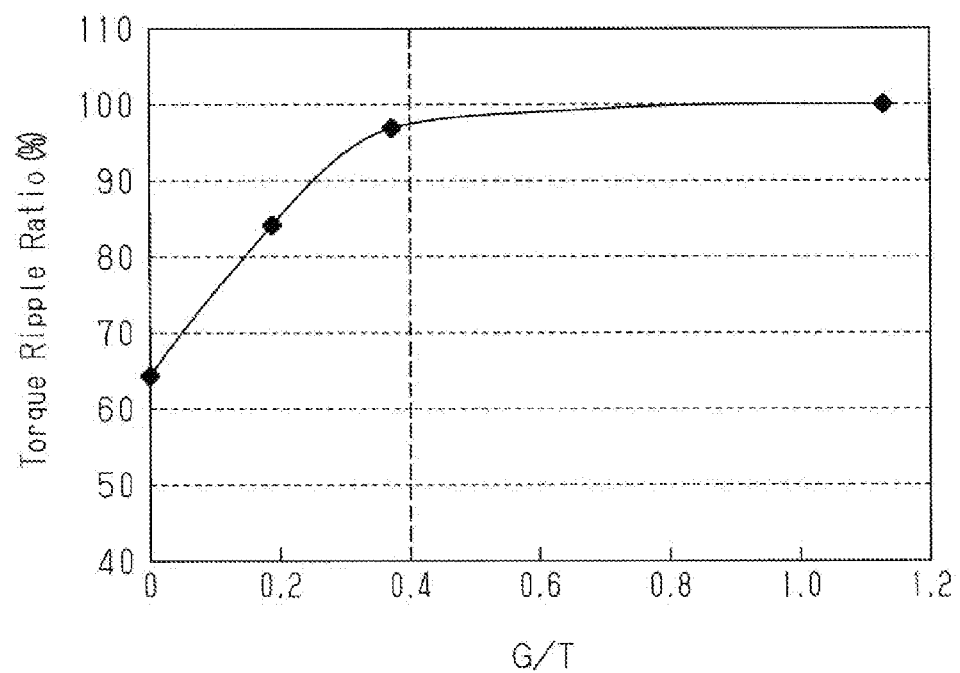
FIG. 19 is a graph showing the relationship between the ratio G/T and the torque ripple of the motor shown in FIG. 14.
Figure 20:
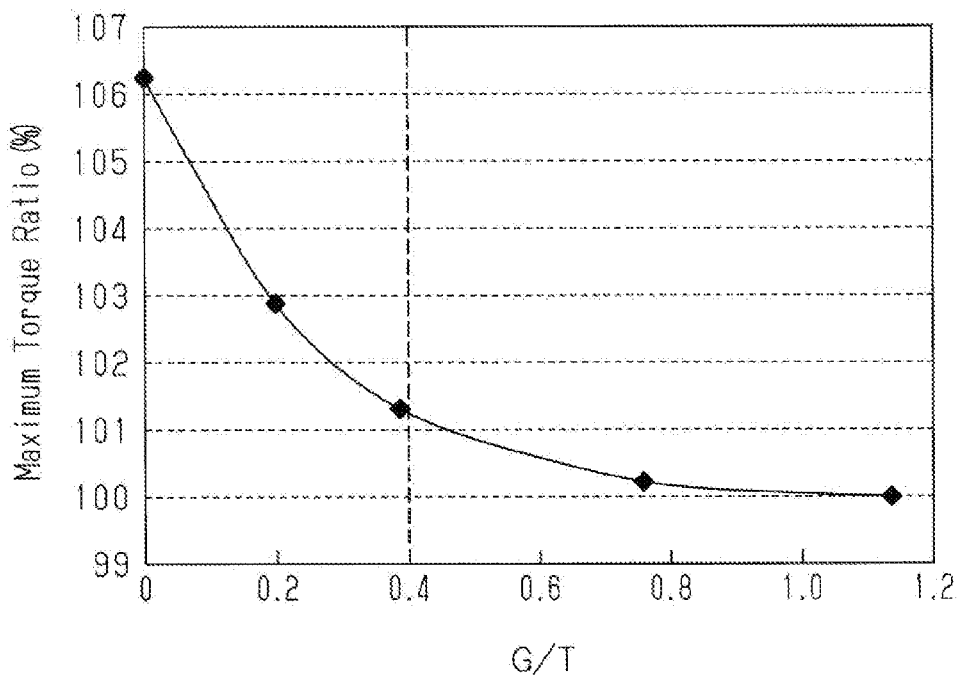
FIG. 20 is a graph showing the relationship between the ratio G/T and the maximum torque of the motor shown in FIG. 14.
Figure 23:
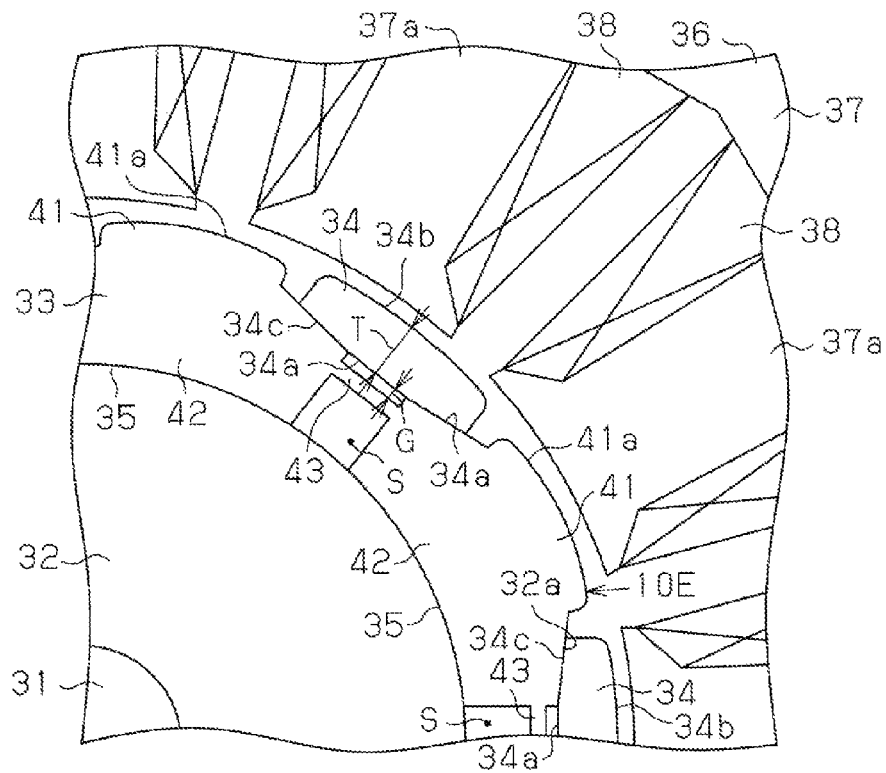
FIG. 23 is an enlarged partial view illustrating a motor according to a modified embodiment of the fourth embodiment.

The distance between the inner surface 34a of each magnet 34 and the outer surface of the corresponding coupling portion 43 is expressed as a gap length G (see FIG. 23). When the ratio G/T of the gap length G and the radial thickness T of the magnet 34 is changed, the radial pulsation ratio of the motor M changes as shown in FIG. 17, the rotor imbalance force ratio changes as shown in FIG. 18, the torque ripple ratio changes as shown in FIG. 19, and the maximum torque ratio changes as shown in FIG. 20. The radial pulsation, the rotor imbalance force, and the torque ripple are causes of increase in the vibration when the rotor 10E rotates. In the examples shown in FIGS. 14 to 16, the gap length G is zero.

FIG. 17 shows the radial pulsation ratio when the ratio G/T is changed. The radial pulsation at the time when the ratio G/T is increased, that is, when the coupling portion 43 is sufficiently far away from the inner surface 34a of the magnet 34, is set as 100(%). In the range where the ratio G/T is greater than 0.4, the radial pulsation is only slightly reduced from about 100(%) as the ratio G/T is reduced, that is, as the gap G is shortened when the radial thickness T of the magnet 34 is constant. In the range where the ratio G/T is less than or equal to 0.4, the radial pulsation is significantly reduced as the ratio G/T decreases. That is, when G/T≦0.4, the radial pulsation is expected to be reduced. When the ratio G/T is zero (the state where the coupling portion 43 contacts the inner surface 34a of the magnet 34), the radial pulsation is approximately 90(%), so that the reduction of the radial pulsation is maximized.

FIG. 18 shows the rotor imbalance force ratio when the ratio G/T is changed. As in the case described above, the rotor imbalance force at the time when the ratio G/T is sufficiently great is set as 100(%). In the range where the ratio G/T is greater than 0.4, the rotor imbalance force is slightly reduced from about 100(%) as the ratio G/T decreases. In the range where the ratio G/T is less than or equal to 0.4, the rotor imbalance force is significantly reduced as the ratio G/T decreases. That is, when G/T≦0.4, the rotor imbalance force is expected to be reduced. When the ratio G/T is zero, the rotor imbalance force is approximately 40(%), so that the reduction of the rotor imbalance force is maximized.

FIG. 19 shows the torque ripple ratio when the ratio G/T is changed. As in the case described above, the torque ripple at the time when the ratio G/T is sufficiently great is set as 100(%). In the range where the ratio G/T is greater than 0.4, the torque ripple is slightly reduced from about 100(%) as the ratio G/T decreases. In the range where the ratio G/T is less than or equal to 0.4, the torque ripple is significantly reduced as the ratio G/T decreases. That is, when G/T≦0.4, the torque ripple is expected to be reduced. When the ratio G/T is zero, the torque ripple is approximately 65(%), so that the reduction of the torque ripple is maximized.

FIG. 20 shows the maximum torque ratio when the ratio G/T is changed. As in the case described above, the maximum torque at the time when the ratio G/T is sufficiently great is set as 100(%). In the range where the ratio G/T is greater than 0.4, the maximum torque is gradually increased as the ratio G/T decreases. In the range where the ratio G/T is less than or equal to 0.4, the maximum torque is significantly increased as the ratio G/T decreases. That is, when G/T≦0.4, the maximum torque is expected to be increased. When the ratio G/T is zero, the maximum torque is maximized at approximately 106(%).

According to the rotor 10E of the present embodiment, the ratio G/T of the gap length G between the magnet 34 and the coupling portion 43 and the radial dimension of the magnet G is set in the range less than or equal to 0.4, in which the radial pulsation and the rotor imbalance force, and the torque ripple can be reduced and the torque can be increased. Specifically, the ratio G/T is set as zero, at which the effects are maximized. Accordingly, the radial pulsation (FIG. 17), which is a cause of vibration when the rotor 10E rotates, the rotor imbalance force (FIG. 18), and the torque ripple (FIG. 19) are reduced, and the torque is increased. As a result, the causes of the vibration when the rotor 10E rotates are reduced, and the rotational performance of the rotor 10E is improved.

Figure 21:
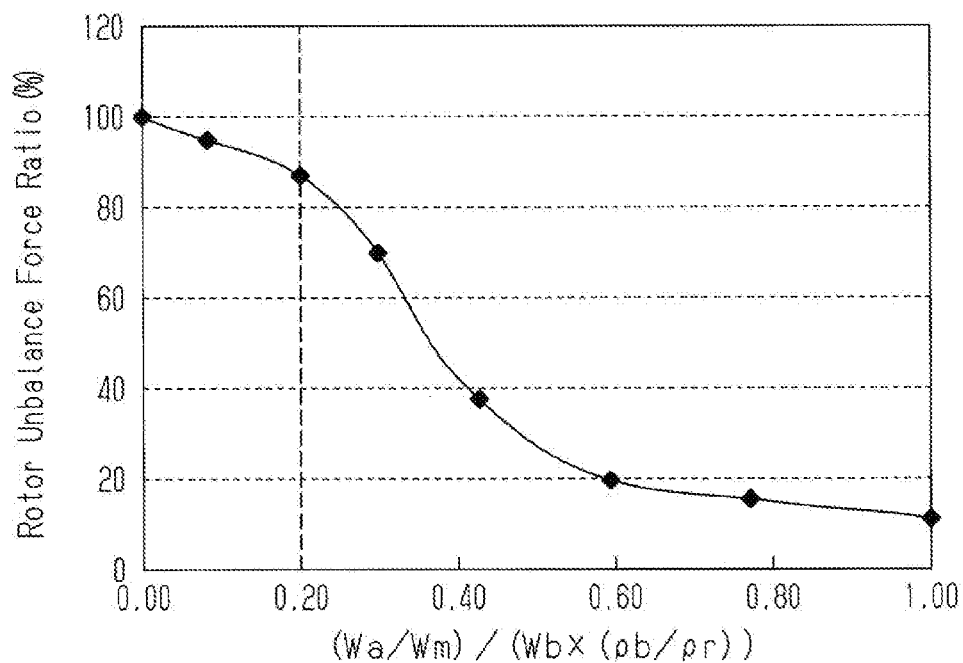
FIG. 21 is a graph showing the relationship between (Wa/Wm)/(Wb×(ρb/ρr)) and the rotor unbalance force of the motor shown in FIG. 14.
Figure 22:
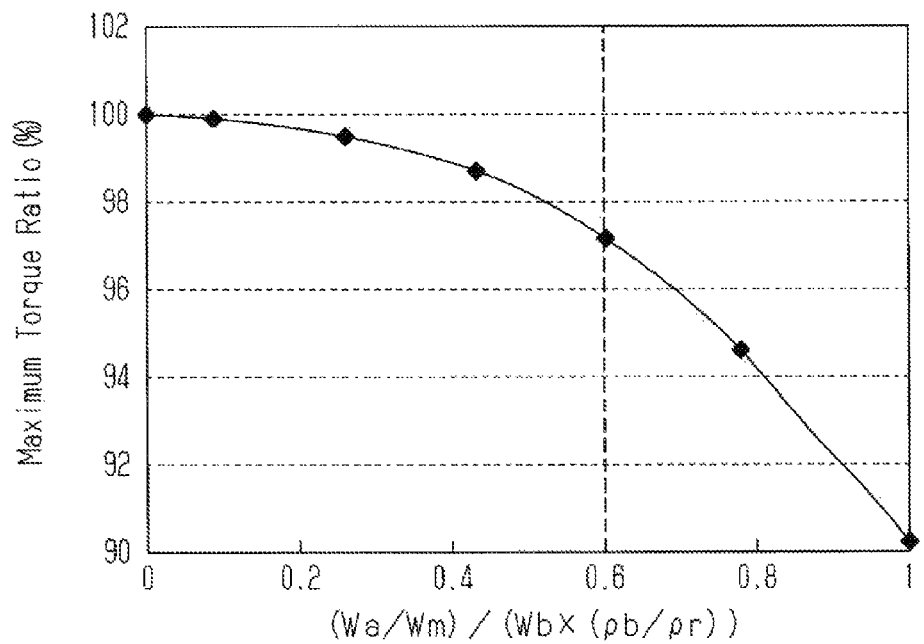
FIG. 22 is a graph showing the relationship between (Wa/Wm)/(Wb×(ρb/ρr)) and the maximum torque of the motor shown in FIG. 14.

FIGS. 21 and 22 show the rotor imbalance force ratio and the maximum torque ratio, respectively, when (Wa/Wm)/(Wb×(ρb/ρr)) is changed, in which the width (circumferential dimension) of the spaces S is expressed by Wa, the width of (circumferential dimension) of the magnets 34 is expressed by Wm, the radial thickness of the coupling portion 43 is expressed by Wb, the space factor of the rotor core 33 is expressed by ρr, and the space factor of the coupling portion 43 is expressed by ρb. The space factor ρr of the rotor core 33 refers to the amount of passing magnetic flux per unit area in parts other than the coupling portions 43 of the rotor core 33, as viewed in the radial direction (or the circumferential direction). The space factor ρr of the coupling portion 43 refers to the amount of passing magnetic flux per unit area in the coupling portion 43 as viewed in the radial direction (or the circumferential direction).

FIG. 21 shows the rotor imbalance force ratio when (Wa/Wm)/(Wb×(ρb/ρr)) is changed. The rotor imbalance force at the time when (Wa/Wm)/(Wb×(ρb/ρr)) is zero is set as 100 (%). In the range where (Wa/Wm)/(Wb×(ρb/ρr))<0.25, the rotor imbalance force is only gradually reduced as (Wa/Wm)/(Wb×(ρb/ρr)) increases from zero. In the range where 0.25≦(Wa/Wm)/(Wb×(ρb/ρr)), the rotor imbalance force is significantly reduced as (Wa/Wm)/(Wb×(ρb/ρr)) increases. That is, when 0.25≦(Wa/Wm)/(Wb×(ρb/ρr)), the rotor imbalance force is expected to be reduced.

FIG. 22 shows the maximum torque ratio when (Wa/Wm)/(Wb×(ρb/ρr)) is changed. The maximum torque at the time when (Wa/Wm)/(Wb×(ρb/ρr)) is zero is set as 100(%). In the range where (Wa/Wm)/(Wb×(ρb/ρr))≦0.6, the maximum torque is gradually reduced as (Wa/Wm)/(Wb×(ρb/ρr)) increases from zero. In the range where 0.6<(Wa/Wm)/(Wb×(ρb/ρr)), the maximum torque is significantly reduced as (Wa/Wm)/(Wb×(ρb/ρr)) increases. That is, when (Wa/Wm)/(Wb×(ρb/ρr))≦0.6, the rotor is prevented from abruptly dropping.

The present embodiment has the following advantages.

(8) In the rotor 10E of the present embodiment, the space S, which forcibly divides magnetic flux to both sides in the circumferential direction, is provided at a part of the rotor core 33 that faces the inner surface 34a of each magnet 34, and between the circumferentially adjacent corresponding salient pole blocks 35. That is, the spaces S reliably prevent magnetic imbalance from being created by the existence of the salient poles 41, which do not induce magnetic flux. This improves the magnetic balance of the rotor 10E, improving the rotational performance. Specifically, the torque is improved and the vibration is reduced. Further, in the present embodiment, the coupling portion 43 is located between each space S and the corresponding magnet 34 and connects a circumferentially adjacent pair of the salient pole blocks 35 to each other. The coupling portion 43 is configured to be magnetically saturated by the magnetic flux in the vicinity of the inner surface 34a of the magnet 34. Accordingly, the amount of magnetic flux to be divided between both sides in the circumferential direction can be further reliably adjusted.

(9) In the present embodiment, the ratio G/T of the gap length G between the magnet 34 and the coupling portion 43 and the radial dimension T of the magnet 34 is set to be less than or equal to 0.4. This reduces the radial pulsation, the rotor imbalance force, and the torque ripple, which are causes of vibration when the rotor 10E rotates (see FIGS. 17 to 19), thereby improving the rotational performance of the rotor.

(10) In the present embodiment, each coupling portion 43 contacts the inner surface of the corresponding magnet 34 (the ratio G/T is set as zero). Thus, the coupling portion 43 is easily saturated by the magnetic flux in the vicinity of the inner surface 34a. Accordingly, the amount of magnetic flux to be divided between both sides in the circumferential direction can be further reliably adjusted.

A fifth embodiment of the present invention will now be described with reference to FIGS. 24 to 30.

Figure 24:
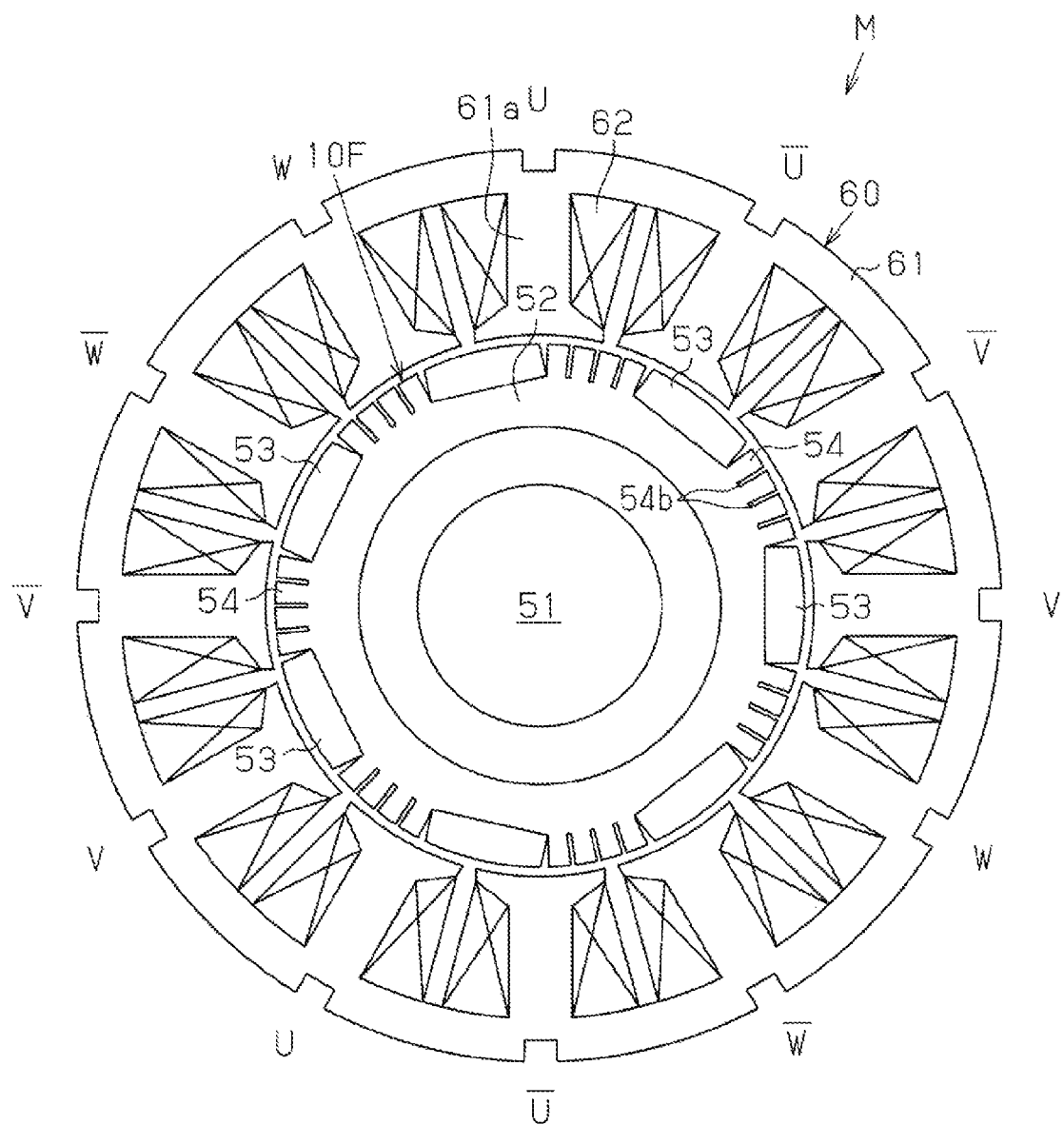
FIG. 24 is a plan view illustrating a motor according to a fifth embodiment of the present invention.
Figure 25:
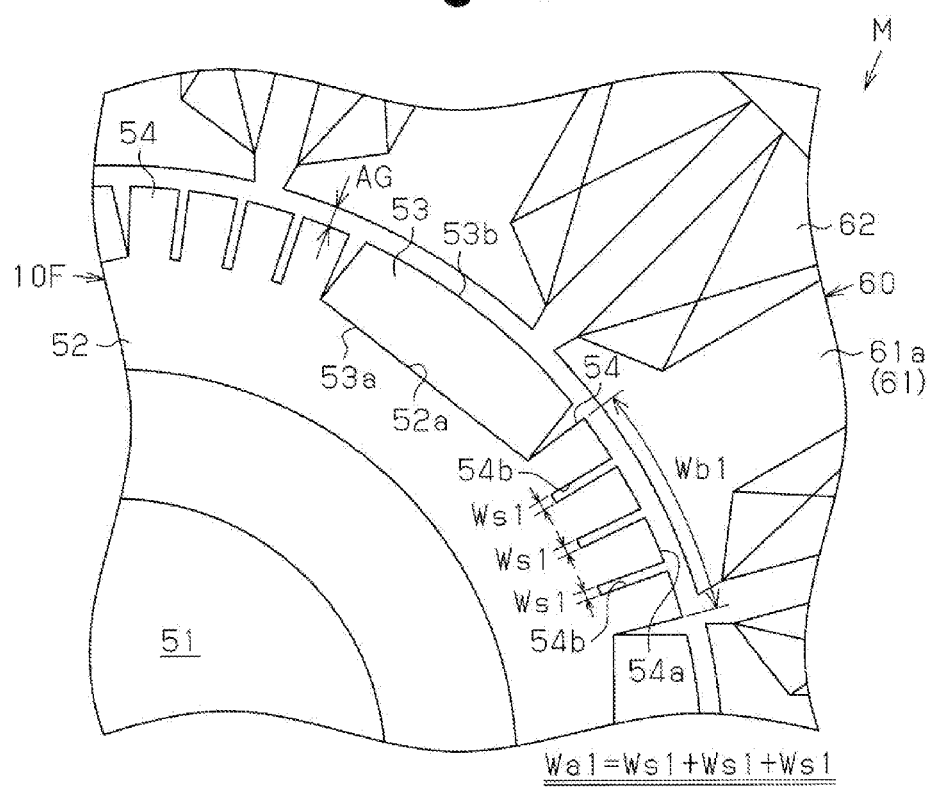
FIG. 25 is an enlarged partial view illustrating the motor shown in FIG. 24.

FIGS. 24 and 25 show an inner rotor brushless motor M. As shown in FIG. 24, a rotor 10F is used in the motor M of the present embodiment. The rotor 10F includes a substantially annular rotor core 52, seven magnets 53, and seven salient poles 54. The rotor core 52 is made of magnetic metal and adhered to the outer circumferential surface of a rotary shaft 51. The magnets 53 are arranged on the outer circumferential portion of the rotor core 52 along the circumferential direction. Each salient pole 54 is located between a circumferentially adjacent pair of the magnets 53. The magnets 53 function as north poles. The salient poles 54 are integrally formed with the rotor core 52 and function as south poles. That is, the rotor 10F is a consequent-pole rotor having fourteen magnetic poles. A stator 60 has a stator core 61 having twelve teeth 61a. A coil 62 is wound about each tooth 61a in a predetermined manner. That is, the stator 60 has twelve magnetic poles. The magnets 53 and the salient poles 54 are alternately arranged on the outer circumference of the rotor 10F in the circumferential direction at equal angular intervals.

The circumferential dimension of the magnets 53 is slightly greater than that of the salient poles 54. Each magnet 53 is substantially formed as a rectangular plate and has a flat inner surface 53a and a curved outer surface (distal surface) 53b. The inner surface 53a of each magnet 53 is adhered to an adherence surface (contact surface) 52a of the rotor core 52 that is formed between a circumferentially adjacent pair of the salient poles 54. Each adherence surface 52a is a flat surface perpendicular to a radial direction of the rotor core 52. The outer surface 53b of each magnet 53 is exposed on the radially outer side of the rotor core 52 so as to directly face the stator 60 (the teeth 61a). That is, the brushless motor M is an SPM motor.

Each salient pole 54 has a shape that projects radially outward. Both circumferential end faces of each salient pole 54 are flat surfaces along the radial direction of the rotor core 52. Both circumferential end faces of each magnet 53 are flat surfaces parallel to a radial straight line that passes through the circumferential center of the magnet 53 and the axis of the rotary shaft 11. Thus, between each salient pole 54 and the circumferentially adjacent magnet 53, a clearance having a triangular cross section is formed so that these do not contact each other in the circumferential direction. The outer surface 54a of each salient pole 54 is curved and is located on the same circumference as the outer surface 53b of the magnets 53. A clearance (air gap length AG) exists between the outer surfaces 53b, 54a of the magnets 53 and the salient poles 54 and the radially inner ends of the teeth 61a of the stator 60.

Each salient pole 54 has three slits 54b, which are formed by linearly cutting out part of the salient pole 54 from the outer surface 54a toward the radially inner end (toward the center of the rotor core 52). The three slits 54b spaced apart at equal angular intervals between the circumferential end faces of the salient pole 54. The slits 54b all have the same shape. The slits 54b extend from the outer surface 54a of the salient pole 54 to the proximal portion of the salient pole 54. That is, the radial dimension of the slits 54b is equal to the protruding length of the salient pole 54. The width (circumferential dimension) of each slit 54b is set as Ws1. Also, each slit 54b extends through the rotor 10F (the rotor core 52) in the axial direction. The flow of magnetic flux is improved in the salient pole 54 because of the slits 54b.

Figure 26A:
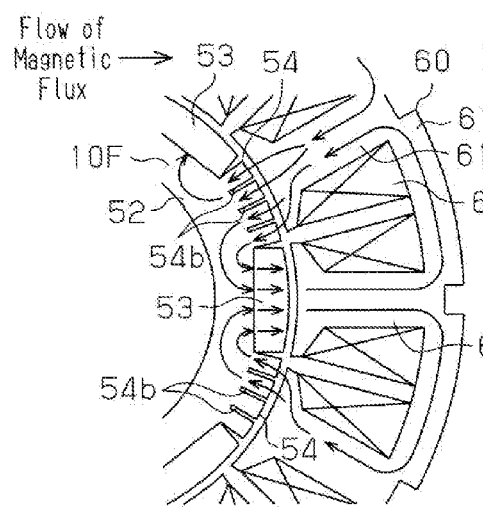
FIG. 26A is a diagram for explaining the flow of magnetic flux in the motor shown in FIG. 24.
Figure 26B:
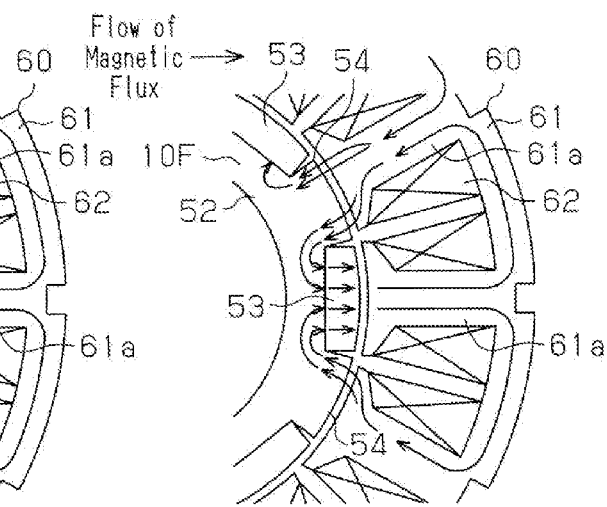
FIG. 26B is a diagram for explaining the flow of magnetic flux in a motor in which no slit is formed in the salient poles.

As shown in FIG. 26A, since the slits 54b are formed in each salient pole 54, the flow of magnetic flux in each salient pole 54 is divided between both sides in the circumferential direction of each slit 54b. That is, the number of teeth is virtually increased. The flow of magnetic flux is dispersed in the circumferential direction in each salient pole 54 and tooth 61a, and the flow of magnetic flux in each salient pole 54 approximates the flow of magnetic flux in each magnet 53. This equalizes the magnetic flux density in each salient pole 54 and tooth 61a, so as to prevent magnetic saturation in the salient pole 54 and the tooth 61a. In contrast, if no slits 54b are formed in the salient poles 54 as shown in FIG. 26B, the flow of magnetic flux in each salient pole 54 and tooth 61a is divided into two large flows on both sides in the circumferential direction, so that magnetic flux is locally concentrated. This increases the difference between the high magnetic flux density and the low magnetic flux density within each salient pole 54 and each tooth 61a, thus leading to local magnetic saturation. Therefore, the slits 54b in the salient pole 54 of the present invention are effective.

The sum of the widths Ws1 of the slits 54b in a single salient pole 54 is expressed by a total slit width Wa1. If the ratio Wa1/Wb1 between the total width Wa and the width (circumferential dimension) Wb1 of the single salient pole 54 is changed, the motor torque is changed. Therefore, the torque ratio relative to the ratio Wa/Wb 1 was measured.

Figure 27:
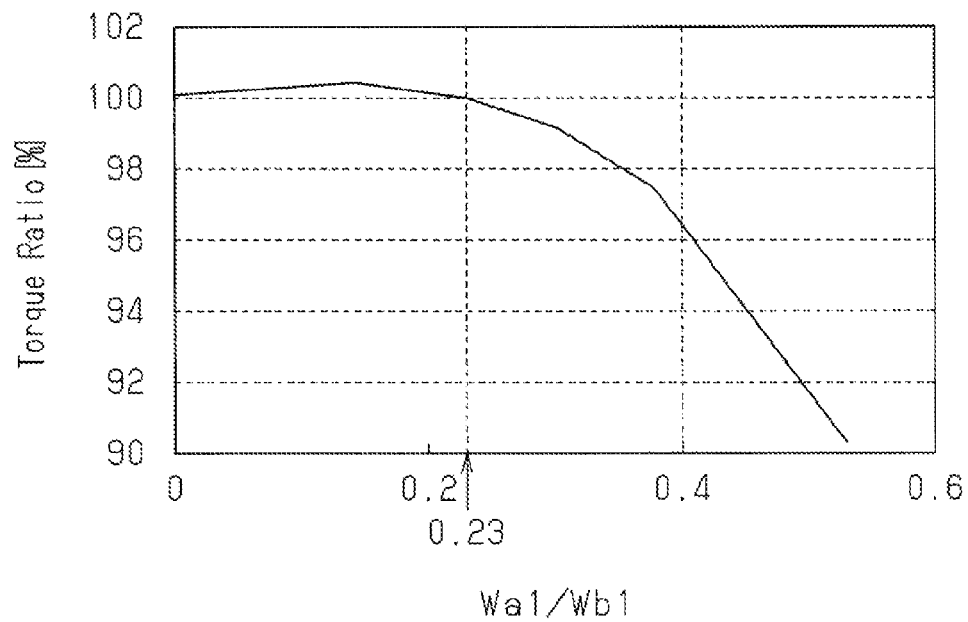
FIG. 27 is a graph showing the relationship between the ratio Wa1/Wb1 and the torque of the motor shown in FIG. 24.

FIG. 27 shows the torque ratio of the motor M when the ratio Wa1/Wb1 was changed. The motor torque when the ratio Wa1/Wb1 was zero, that is, when no slits 54b were provided, was set as 100%. The torque ratio was over 100% until the ratio Wa1/Wb1 reached about 0.2 (approximately 0.23). As the ratio Wa1/Wb1 further increased, the torque ratio 100% decreased. With reference to FIG. 27, a sufficient torque was obtained in the range where 0<Wa1/Wb1≦0.4. It is therefore preferable that the ratio Wa1/Wb1 be set in this range. The range where $0 < Wa1/Wb1 \leq 0.23$ is particularly preferable since the torque was greater than 100% in this range.

If the ratio Ws1/Ag of the width Ws1 of each slit 54b and the air gap length AG, which is the distance between the rotor 10F and the stator 60, is changed, the torque ripple is changed. Therefore, the torque ripple ratio in relation to the ratio Ws1/AG was measured.

Figure 28:
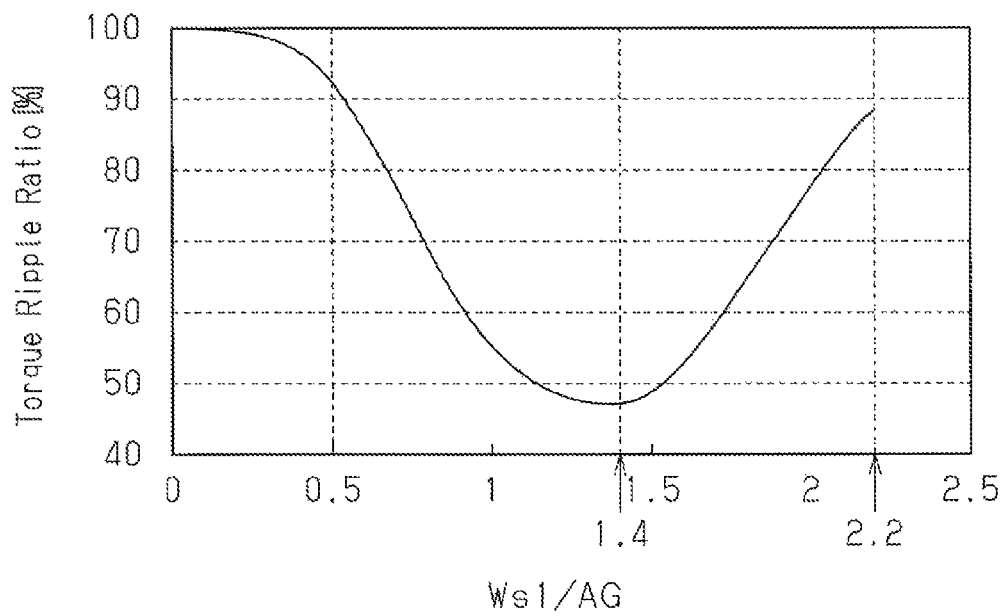
FIG. 28 is a graph showing the relationship between the ratio Ws1/AG and the torque ripple of the motor shown in FIG. 24.

FIG. 28 shows the torque ripple ratio when the ratio Ws1/AG was changed. The torque ripple when the ratio Ws1/AG was zero, that is, when no slits 54b were provided, was set as 100%. In this case, the torque ripple gradually decreased as the ratio Ws1/AG increased. The torque ripple had the minimum value, or approximately 48%, when the ratio Ws1/AG was approximately 1.4. As the ratio Ws1/AG increased further, the torque ripple gradually increased. When the ratio Ws1/AG was approximately 2.2, the torque ripple reached approximately 88%. With reference to FIG. 28, in the range where $0.5 \leq Ws1/AG \leq 2.2$, the torque ripple was effectively reduced. The ratio Ws1/AG is therefore preferably set in this range. Particularly, if the ratio Ws1/AG is more preferably set at about 1.4, the torque ripple is sufficiently reduced.

Taking the above results into consideration, the ratio Wa1/Wb1 of the total width Wa1 of the slits 54b in a single salient pole 54 and the circumferential width Wb1 of the salient pole 54 is set in the range where $0 < Wa1/Wb1 \leq 0.4$. The ratio Ws1/AG of the width Ws1 of each slit 54b and the air gap length AG is set the range where $0.5 \leq Ws1/AG \leq 2.2$. That is, by forming slits 54b in each salient pole 54 of the rotor 10F and optimizing the shape and size of the slits 54b, vibration of the motor M is reduced, while generating sufficient torque.

Figure 29:
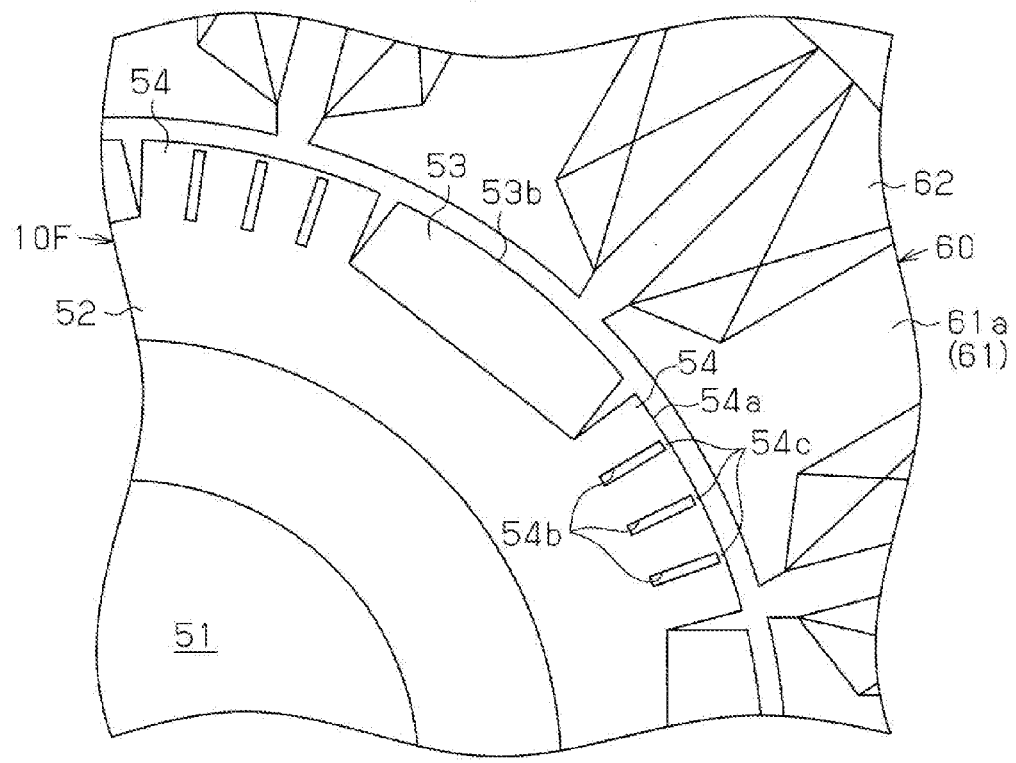
FIG. 29 is an enlarged partial view illustrating a motor according to a modification of the fifth embodiment.
Figure 30:
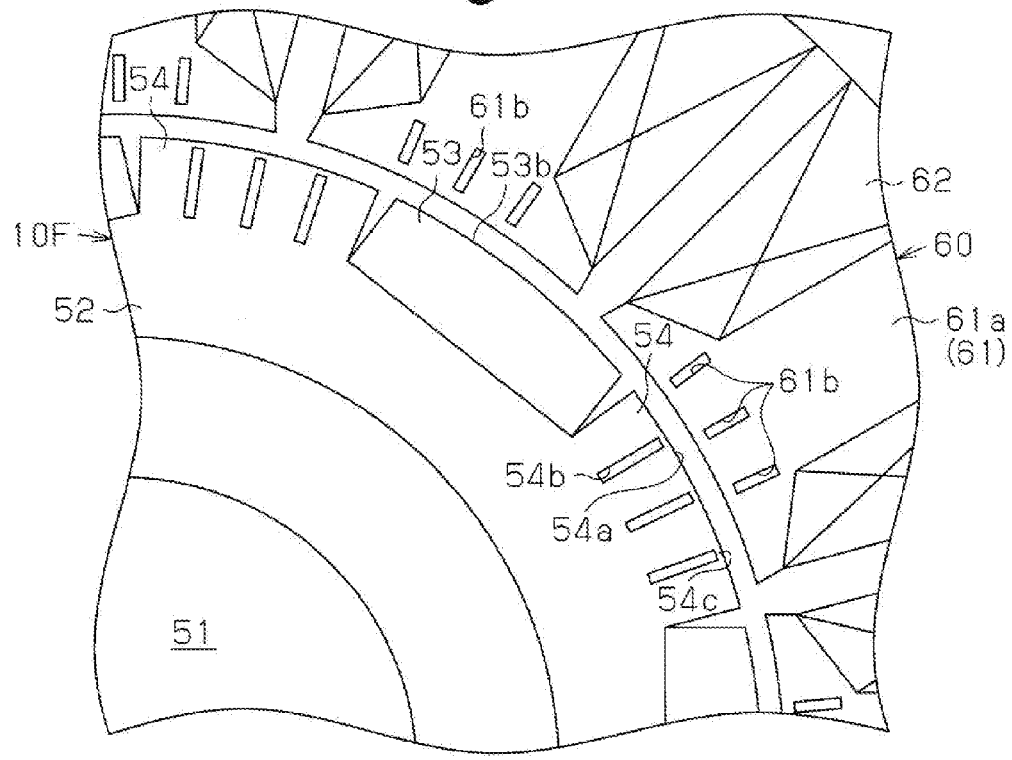
FIG. 30 is an enlarged partial view illustrating a motor according to a modification of the fifth embodiment.

In the above description, the slits 54b open to the radially outside. However, as shown in FIG. 29, the rotor core 52 may have bridging portions 54c, each of which is located between a slit 54b and the outer surface 54a of the salient pole 54 in the radially outer end of the salient poles 54. This structure improves the rigidity of the salient pole 54, thereby improving the rigidity of the rotor 10F. Accordingly, the vibration noise of the motor M is reduced. Further, as shown in FIG. 30, each tooth 61a may have slits 61b in a part close to the radially inner end. The number and the angular pitch of the slits 61b of the tooth 61a are the same as those of the slits 54b of the salient pole 54. The slits 61b in each tooth 61a improve the flow of magnetic flux in the tooth 61a. In FIG. 30, the slits 61b are not open to the radially inner side. However, the slits 61b may be open to the radially inner side. The number and the angular pitch of the slits 61b of the teeth 61a are not particularly limited to those described above.

The present embodiment has the following advantages.

(11) In the rotor 10F of the present embodiment, the slits 54b are formed either in the outer surface 54a of each salient pole 54 as shown in FIG. 25 or in each salient pole 54 as shown in FIGS. 29 and 30. That is, the slits 54b formed in each salient pole 54 improve the flow of magnetic flux in the salient pole 54, so that the flow approximates the flow of magnetic flux from the magnets 53. This improves the magnetic balance of the rotor 10F, and therefore reduces motor vibration.

(12) In the present embodiment, the radial dimension of the slits 54b is equal to the protruding length of the salient pole 54. This allows the magnetic flux in the salient pole 54 to flow along the radial direction, so that the flow more reliably approximates the flow of magnetic flux in the magnets 53. This further reliably improves the magnetic balance of the rotor 10F, and therefore reduces motor vibration. Also, by optimizing the shape and size of the slits 54b, the motor properties are adjusted. Specifically, motor vibration is reduced and the motor torque is improved. Further, since the radial dimension of the slits 54b is substantially equal to the protruding length of the salient poles 54, the slits 54b reduces the weight of the rotor core 52, leading to reduction in weight of the rotor 10F. As a result, the inertia of the rotor 10F is reduced.

A sixth embodiment of the present invention will now be described with reference to FIGS. 31 to 36.

Figure 31:
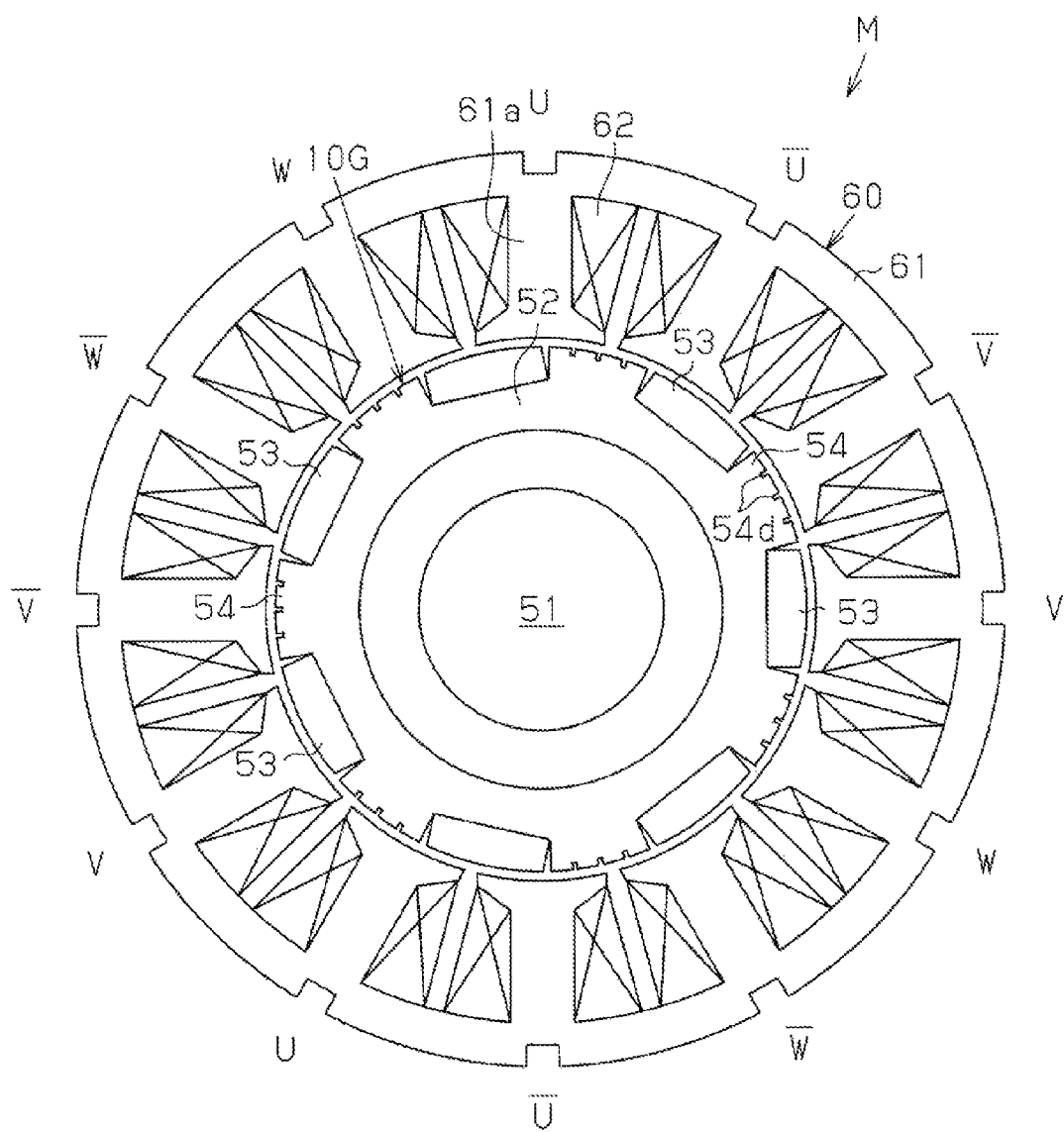
FIG. 31 is a plan view illustrating a motor according to a sixth embodiment.
Figure 32:
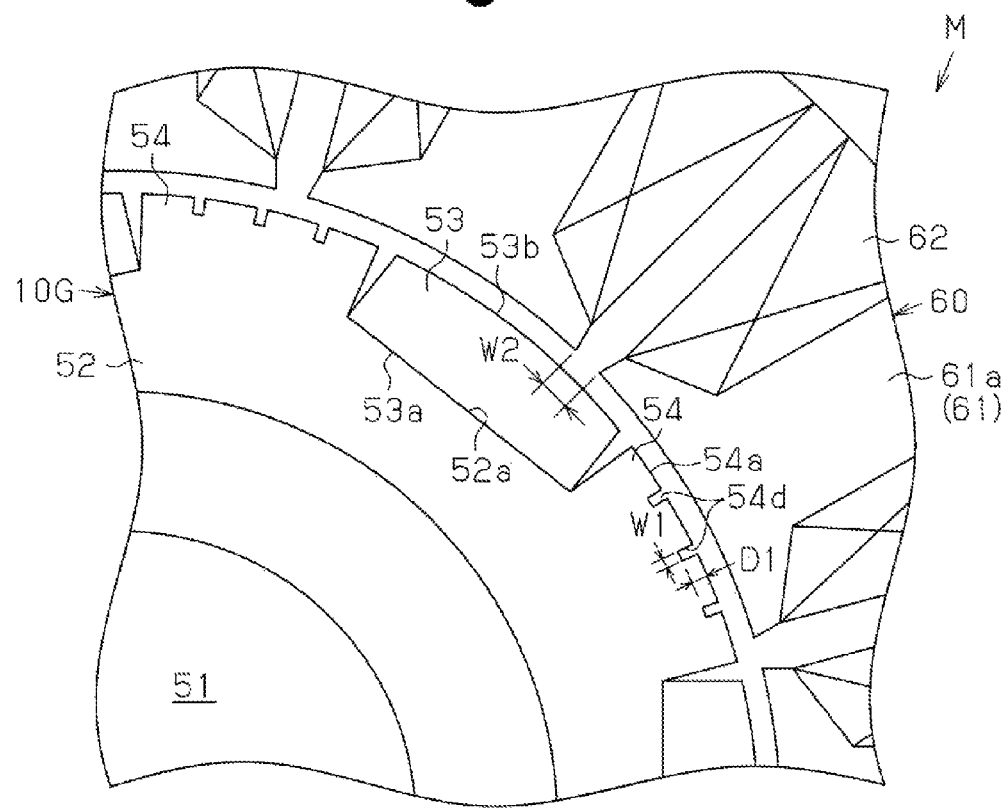
FIG. 32 is an enlarged partial view illustrating the motor shown in FIG. 33.

Like the fifth embodiment, a rotor 10G used in a motor M of the present invention has three slits 54d, which are spaced at equal angular intervals, in each salient pole 54 as shown in FIGS. 31 and 32. In each salient pole 54, the slits 54d are located in the outer surface 54a (distal surface) and extends through the salient pole 54 in the axial direction. The width (circumferential dimension) W1 and the depth (radial dimension) D1 of each slit 54d are each set to a predetermined value, such that the depth D1 is less than the protruding length (radial dimension) of the salient pole 54.

Figure 33:
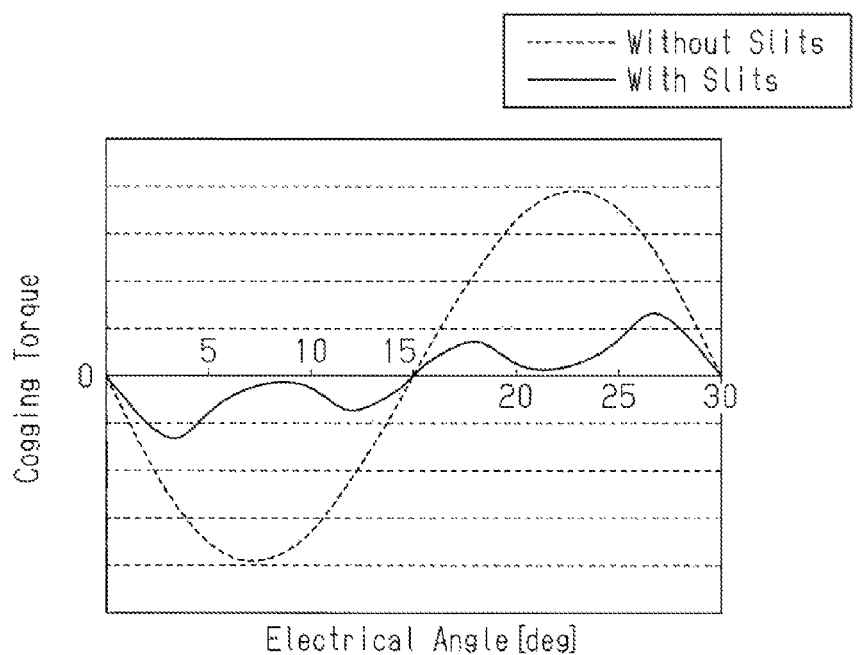
FIG. 33 is a graph showing the relationship between the electrical angle and the cogging torque in the motor shown in FIG. 33.
Figure 35:
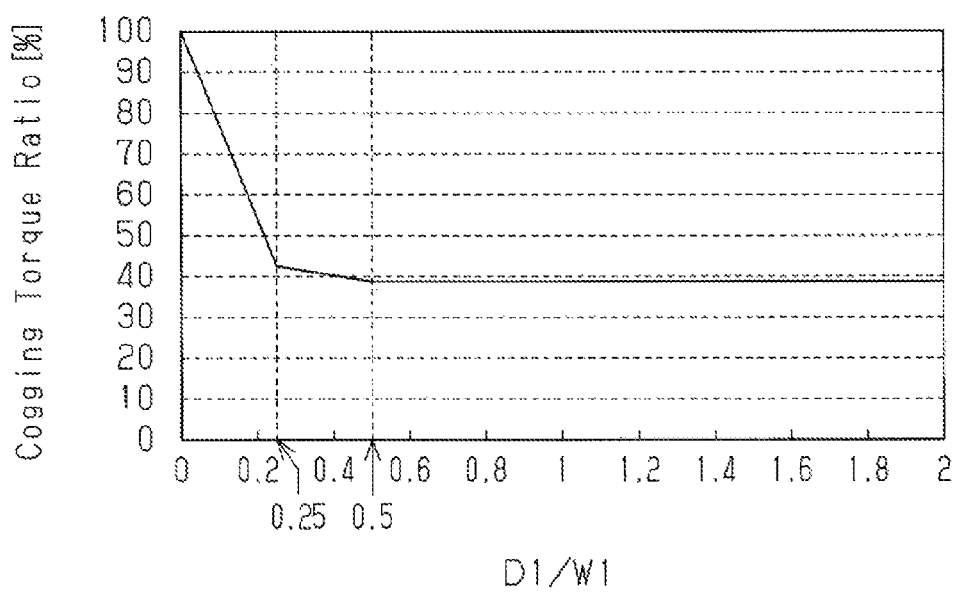
FIG. 35 is a graph showing the relationship between the ratio D1/W2 and the cogging torque of the motor shown in FIG. 33.

FIG. 33 shows changes of the cogging torque in a range of the electrical angle from 0° to 30°, in a case where the slits 54d are formed in each salient pole 54 and no slits 54d are formed. The cogging torque accompanying rotation of the rotor 10G repeats this change within the range of 30° of electrical angle. As in the fifth embodiment, the flow of magnetic flux in the salient poles 54 and the teeth 61a is improved by being dispersed in the circumferential direction in the present embodiment as shown in FIG. 35. This virtually increases the number of teeth. Therefore, compared to a rotor having no slits 54d, the cogging torque is reduced to a lower level.

When the ratio W1/W2 of the width W1 of the slits 54d and the distance between the radially inner ends of each circumferentially adjacent pair of the teeth 61a, or the inter-teeth width W2 is changed, the cogging torque is changed, accordingly. Therefore, the cogging torque ratio in relation to the ratio W1/W2 was measured.

Figure 34:
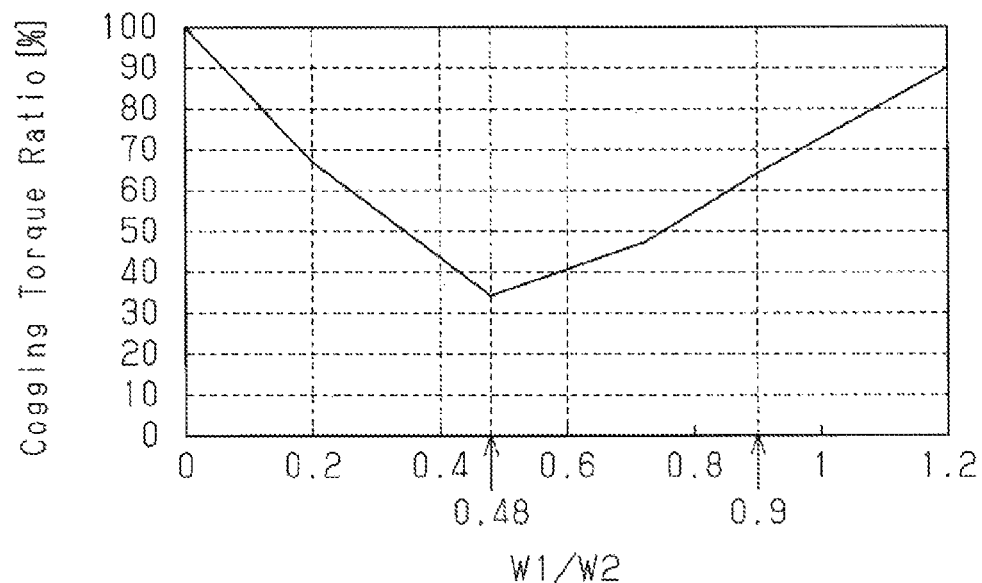
FIG. 34 is a graph showing the relationship between the ratio W1/W2 and the cogging torque of the motor shown in FIG. 33.

FIG. 34 shows the cogging torque ratio when the ratio W1/W2 was changed. The cogging torque when the ratio W1/W2 was zero, that is, when no slits 54d were provided in the salient poles 54, was set as 100%. In this case, the cogging torque gradually decreased as the ratio W1/W2 increased. The cogging torque had the minimum value, or approximately 35%, when the ratio W1/W2 was about 0.5 (approximately 0.48). As the ratio W1/W2 increased further, the cogging torque gradually increased. When the ratio W1/W2 was 1.2, the cogging torque reached approximately 90%. With reference to FIG. 34, the cogging torque was reduced in the range where $0.2 \leq W1/W2 \leq 0.4$. It is therefore preferable that the ratio W1/W2 be set in this range. The range where $0.4 \leq W1/W2 \leq 0.6$ is particularly preferable since the cogging torque is sufficiently reduced in this range.

When the ratio D1/W2 of the depth D1 and the width W1 of the slits 54d of each salient pole 54 is changed, the cogging torque is changed, accordingly. Therefore, the cogging torque ratio in relation to the ratio D1/W2 was measured.

Figure 37:
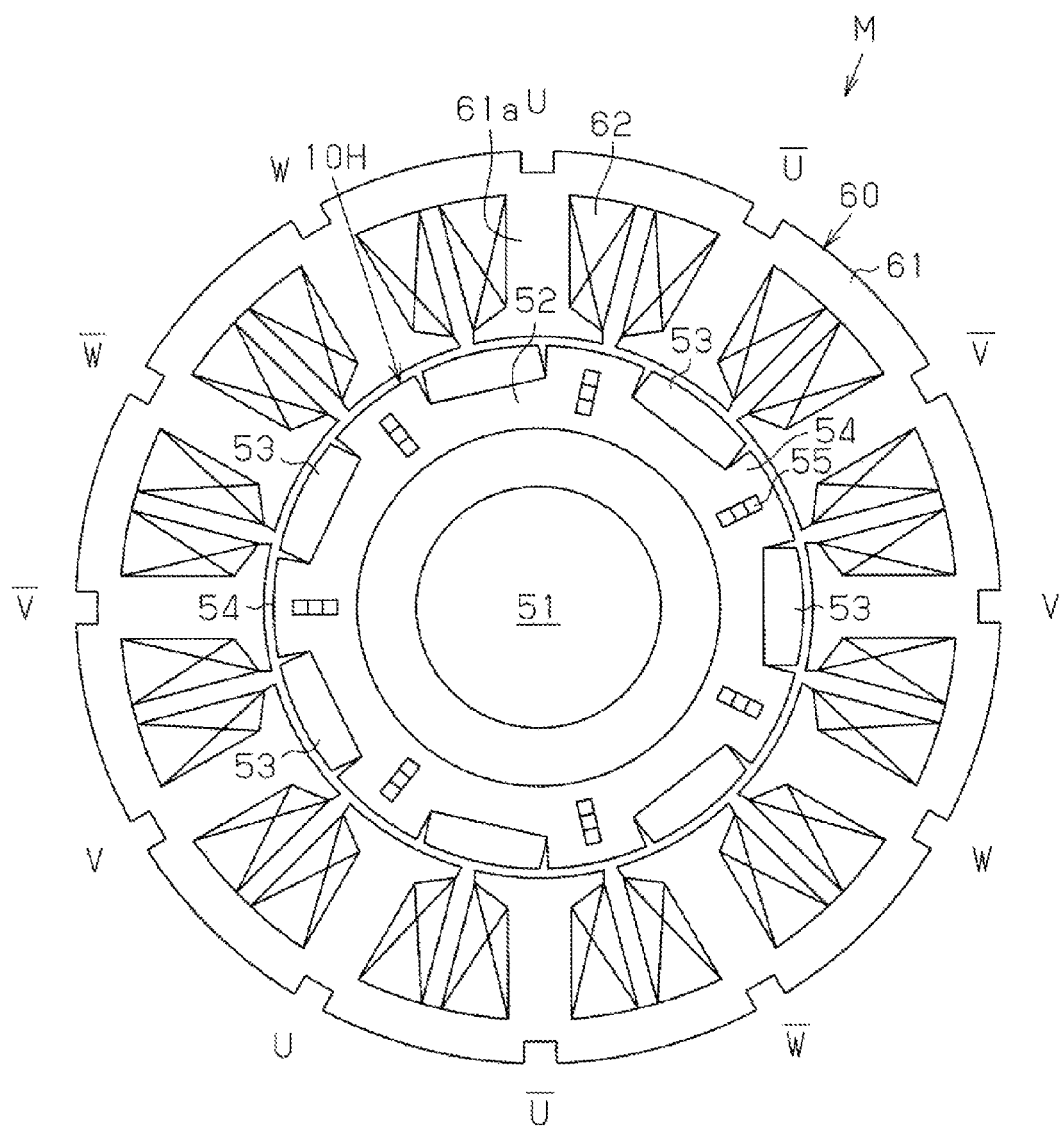
FIG. 37 is a plan view illustrating a motor according to a seventh embodiment of the present invention.

FIG. 35 shows the cogging torque ratio when the ratio D1/W1 was changed. The cogging torque when the ratio D1/W1 was zero, that is, when no slits 54d were provided in the salient poles 54, was set as 100%. In this case, the cogging torque gradually decreased as the ratio D1/W1 increased. The cogging torque dropped to approximately 43% when the ratio D1/W1 was approximately 0.25. When the ratio D1/W1 was increased to approximately 0.5, the cogging torque dropped to approximately 38%. Thereafter, the cogging torque remained constant even through the ratio D1/W1 increased. With reference to FIG. 37, the cogging torque was reduced in the range where $0.25 \leq D1/W1$. It is therefore preferable that the ratio D1/W1 be set in this range. The range where $0.25 \leq D1/W1 \leq 0.5$ is particularly preferable since the cogging torque is further reduced in this range.

In the present embodiment, the ratio W1/W2 of the width W1 and the circumferential dimension W2 of the teeth 61a is set in the range where $0.2 \leq W1/W2 \leq 0.9$, and the ratio D1/W1 of the depth D1 and the width W1 of the slits 54d of the salient poles 54 is set in the range where $0.25 \leq D1/W1$. That is, by forming slits 54d in each salient pole 54 of the rotor 10G and optimizing the shape and size of the slits 54d, vibration of the motor M is reduced.

Figure 36:
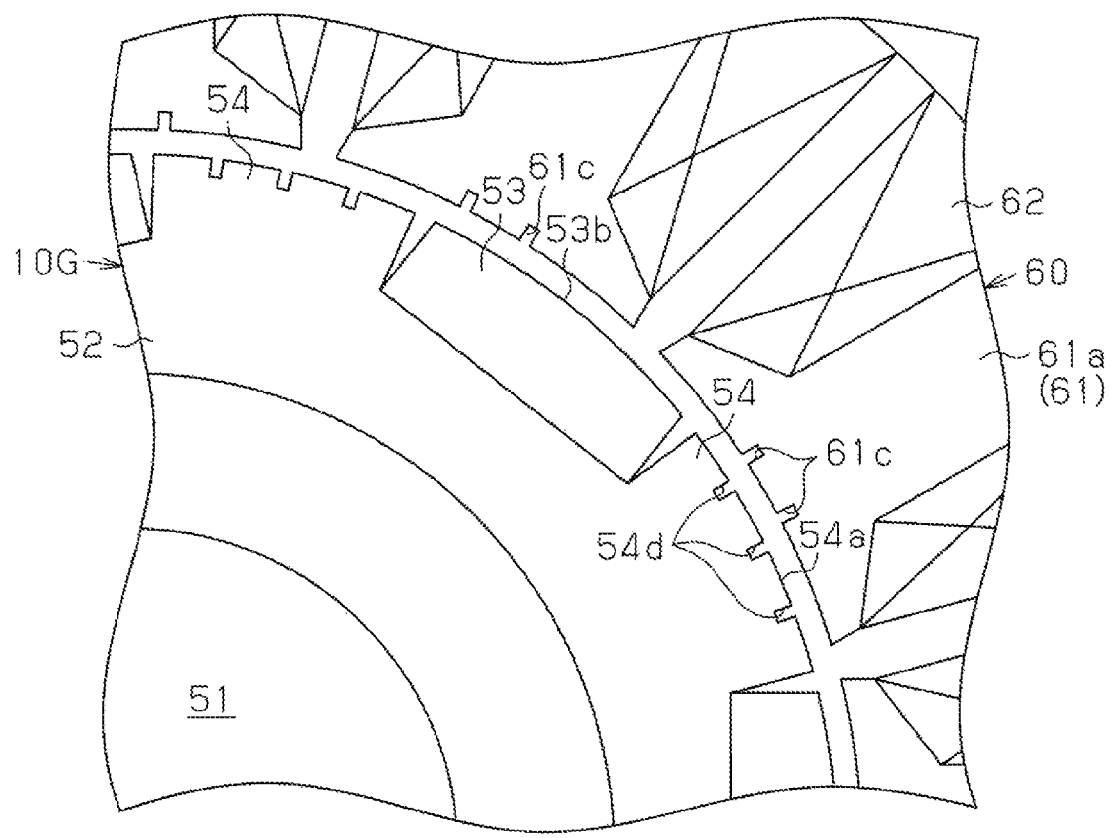
FIG. 36 is an enlarged partial view illustrating a motor according to a modification of the sixth embodiment.

As shown in FIG. 36, each tooth 61a may have slits 61c, which open radially inward. The slits 61c are arranged in pairs along the circumferential direction. In this case, the flow of magnetic flux in the salient poles 54 and the teeth 61a is improved as in the fifth embodiment. The slits 61c in each tooth 61a do not have to open at the radially inner end face. Further, the number and the angular pitch of the slits 61c of the teeth 61a may be the same as those of the slits 54d of the salient poles 54.

The present embodiment has the following characteristics.

(13) In the rotor 10G of the present embodiment, three slits 54d are formed along the circumferential direction in the outer surface 54a of each salient pole 54, as shown in FIG. 32. That is, the slits 54d in each salient pole 54 improve the flow of magnetic flux in the salient poles 54 and the teeth 61a, so that the flow of magnetic flux in the salient pole 54 and the teeth 61a approximates the flow of magnetic flux in the magnets 53. This improves the magnetic balance of the rotor 10G, and therefore reduces motor vibration.

(14) In the present embodiment, the radial dimension of the slits 54d is less than the protruding length of the salient pole 54. In other words, the amount cutout for forming the slits 54d is small, so that the rigidity of the salient pole 54 is maintained. This further reduces motor vibration. Since the amount cutout for forming the slits 54d is small, the slits 54d can be formed in the salient pole 54 through machining after installment. Also, by optimizing the shape and size of the slits 54d, the motor properties are adjusted. Specifically, motor vibration is reduced and the motor torque is improved.

A seventh embodiment of the present invention will now be described with reference to FIGS. 37 to 43.

Figure 38:
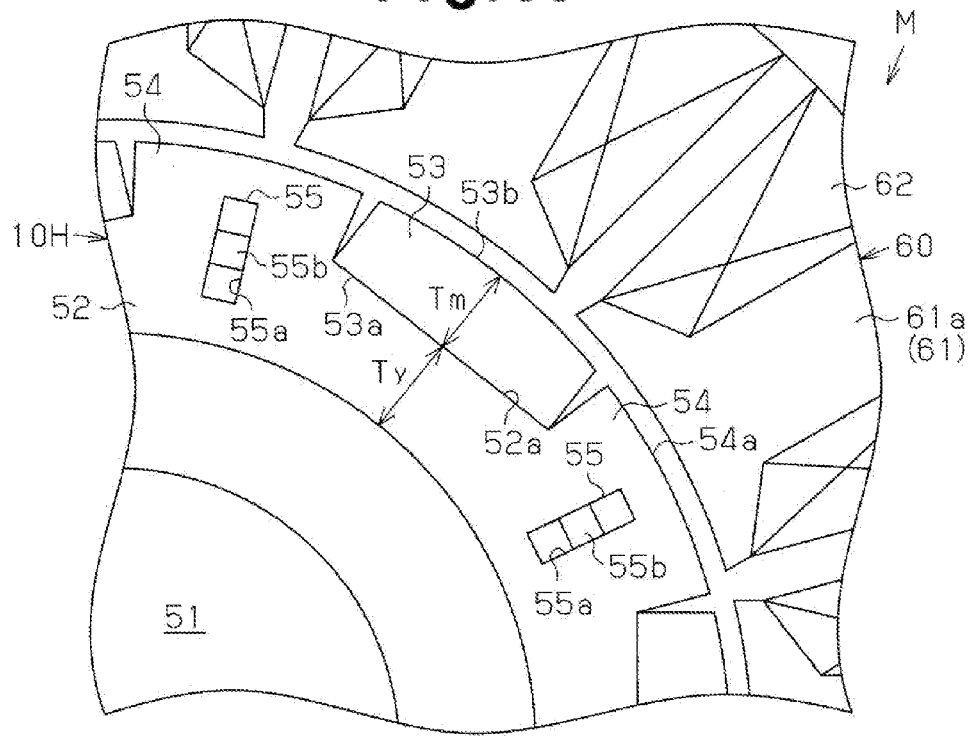
FIG. 38 is an enlarged partial view illustrating the motor shown in FIG. 37.

As shown in FIGS. 37 and 38, a rotor 10H of a motor M according to the present embodiment has swaging portions 55 each at predetermined positions in each salient pole 54. Specifically, the rotor core 52 used in the rotor 10H of the present embodiment is a lamination core, which is formed by laminating a plurality of steel sheets in the axial direction. In each steel sheet, rectangular slits 55a are formed in predetermined parts of the salient poles 54. The steel sheets are laminated together such that the slits 55a are aligned in the axial direction. A swaging member 55b is inserted into each axially continuous set of the slits 55a. By swaging the swaging members 55b, the axially laminated steel sheets are connected together. The swaging portions 55, each of which includes the slit 55a and the swaging member 55b, are provided in each salient pole 54 of the rotor core 52. The swaging portion 55 is located at the center in the circumferential direction of the salient pole 54, and at a position slightly radially inward of the outer surface 54a of the salient pole 54. The swaging portion 55 (slit 55a) has a rectangular cross section as viewed in the axial direction, such that the longer sides extend along the axial direction.

Figure 39A:
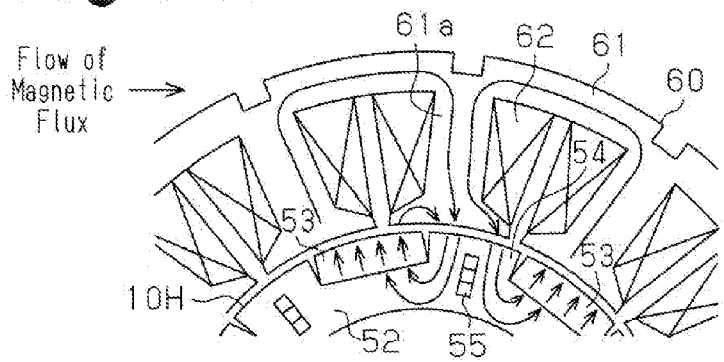
FIG. 39A is a diagram for explaining the flow of magnetic flux in the motor shown in FIG. 37.
Figure 39B:
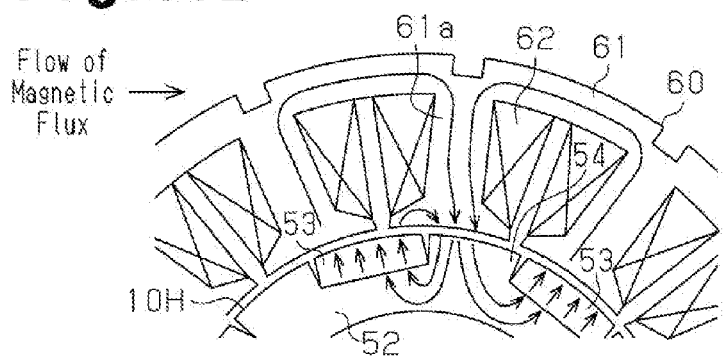
FIG. 39B is a diagram for explaining the flow of magnetic flux in a motor in which no swaging member is provided in the salient poles.

Since the swaging portion 55 is provided in each salient pole 54 as shown in FIG. 39A, the magnetic flux is divided between both sides in the circumferential direction of the swaging portion 55 in each salient pole 54 and flows along the longer sides of the swaging portion 55. Therefore, in each of the salient poles 54 and the teeth 61a, the flow of magnetic flux is improved by being dispersed in the circumferential direction. That is, the distribution of magnetic flux in each of the salient poles 54 and the teeth 61a approximates the distribution of magnetic flux in each magnet 53. In contrast, if the salient pole 54 has no swaging portion 55 as shown in FIG. 39B, the flow of magnetic flux in each salient pole 54 concentrates on one side in the circumferential direction. That is, the magnetic flux is concentrated locally. Therefore, in the present embodiment, the swaging portion 55 provided in each salient pole 54 improves the flow of magnetic flux in each of the salient poles 54 and the teeth 61a, so that vibration of the motor M is reduced.

In the rotor 10H having such swaging portions 55, if the ratio Ty/Tm between the thickness (radial dimension) of the magnets 53, in the present embodiment, the thickness Tm at the center in the circumferential direction, and the thickness Ty at part of the rotor core 52 that faces the inner surface 53a of the magnet 53 (the back yoke thickness) is changed, the torque is changed, accordingly. Therefore, the torque ratio in relation to the ratio Ty/Tm was measured.

Figure 40:
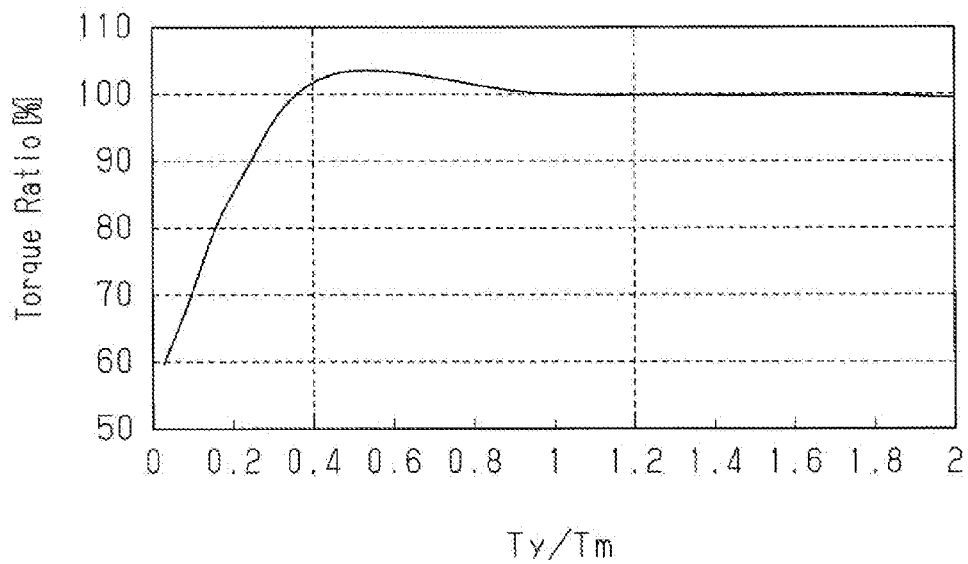
FIG. 40 is a graph showing the relationship between the ratio Ty/Tm and the torque of the motor shown in FIG. 37.

FIG. 40 shows the torque ratio of the motor M when the ratio Ty/Tm was changed. The torque when the ratio Ty/Tm was 1, that is, when the magnet thickness Tm and the back yoke thickness Ty were the same, was set as 100%. When the ratio Ty/tm was greater than 1, the torque was constant at approximately 100% even if the ratio Ty/Tm increased. When the ratio Ty/Tm was less than 1, the torque was over 100% until the ratio Ty/Tm reached about 0.4 (approximately 0.36). When the ratio Ty/Tm was approximately 0.5, the torque had a maximum value of 105%. When the ratio Ty/Tm decreased from about 0.4 (approximately 0.36), the torque gradually decreased from 100%. When the ratio Ty/Tm was approximately 0.2, the torque was approximately 85%. When the ratio Ty/Tm was approximately 0.1, the torque was approximately 70%.

The torque ripple ratio in relation to the ratio Ty/Tm of the back yoke thickness Ty and the magnet thickness Tm was also measured.

Figure 41:
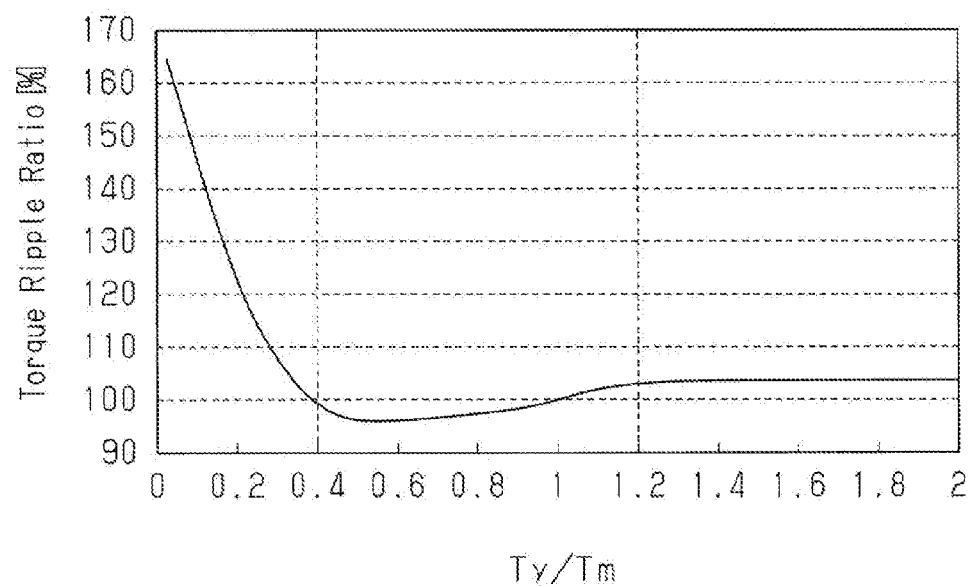
FIG. 41 is a graph showing the relationship between the ratio Ty/Tm and the torque ripple of the motor shown in FIG. 37.

FIG. 41 shows the torque ripple ratio when the ratio Ty/Tm was changed. The torque ripple when the ratio Ty/Tm was 1 was set as 100%. When the ratio Ty/tm was greater than 1, the torque ripple increased to approximately 105% when ratio Ty/Tm was 1.2. Thereafter, the torque ripple was substantially constant. When the ratio Ty/tm was less than 1, the torque ripple had the maximum value of 95% when the ratio Ty/tm was approximately 0.5. When the ratio Ty/Tm decreased from approximately 0.5, the torque ripple gradually increased. When the ratio Ty/Tm was approximately 0.2, the torque ripple was approximately 120%. When the ratio Ty/Tm was approximately 0.1, the torque ripple was approximately 145%.

Taking the above results into consideration, the ratio Ty/Tm of the back yoke thickness Ty and the magnet thickness Tm is set in the range where $0.4 \leq Ty/Tm \leq 1.2$. Thus, the swaging portions 55 are formed in the salient poles 54, so as to improve the flow of magnetic flux, thereby reducing the vibration of the motor M. Also, the ratio Ty/Tm of the back yoke thickness Ty and the magnet thickness Tm is optimized, thereby improving the motor torque and the torque ripple. Particularly, if the ratio Ty/Tm is set in the range where $0.4 \leq Ty/Tm \leq 1$, the torque is increased and the torque ripple is reduced. This range is therefore preferable.

In the above, a plurality of steel sheets forming the rotor core 52 are coupled together by fitting the swaging members 55b in the slits 55a. However, other coupling means may be used. For example, steel sheets may be coupled together in the axial direction by fitting projections and recesses formed in the steel sheets. Even in this case, the coupling portions of the recesses and projections (swaging) function in the same manner as the slits 55a, so as to improve the flow of magnetic flux in the salient poles 54.

The present embodiment has the following advantages.

(15) In the rotor 10H of the present embodiment, the slits 55a (swaging portions 55) are formed in the salient poles 54 as shown in FIG. 38. That is, the slits 55a formed in each salient pole 54 improve the flow of magnetic flux in the salient pole 54 and the teeth 61a in the present embodiment, so that the flow approximates the flow of magnetic flux in the magnets 53. This improves the magnetic balance of the rotor 10H, and therefore reduces motor vibration.

(16) In the present embodiment, the rotor core 52 is a lamination core formed by laminating a plurality of steel sheets in the axial direction. Each salient pole 54 has slits 55a. The swaging member 55b is inserted in each slit 55a, so as to couple the steel sheets together. That is, the swaging member 55b is inserted in the slit 55a, which improves the flow of magnetic flux in the salient pole 54, and the steel sheets in the lamination core are connected together by means of the slits 55a. Therefore, no coupling means for coupling the steel sheets together do not need to be provided elsewhere. This reduces the weight of the rotor 10H.

(17) In the present embodiment, the back yoke thickness Ty of the rotor core 52 is optimized to prevent the size of the core 52 from being unnecessarily increased. This reduces the weight of the rotor core 52, or reducing the weight of the rotor 10H. The inertia of the rotor 10H is also reduced.

An eighth embodiment of the present invention will now be described with reference to FIGS. 42 to 49.

Figure 42:
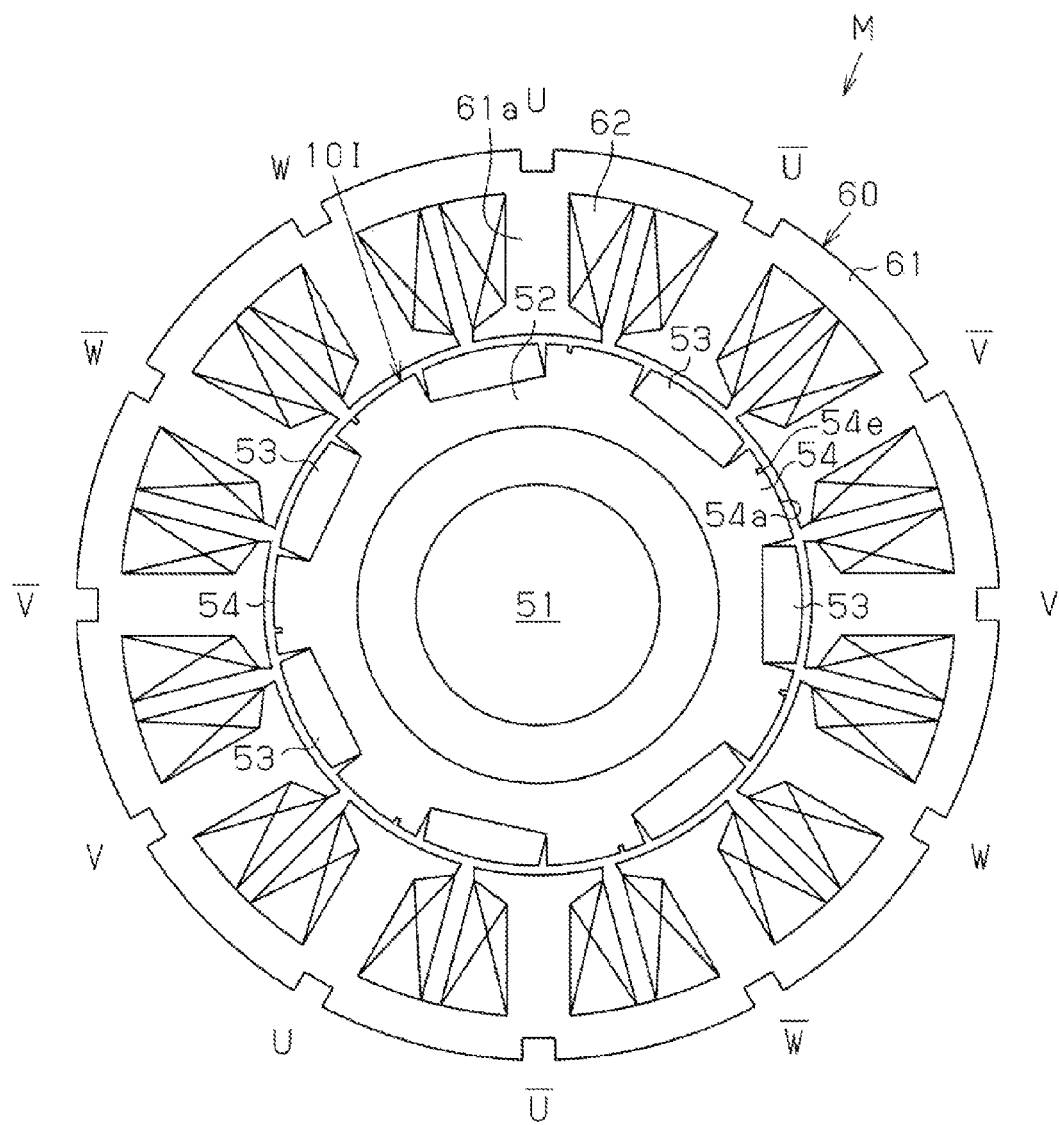
FIG. 42 is a plan view illustrating a motor according to an eighth embodiment of the present invention.
Figure 43:
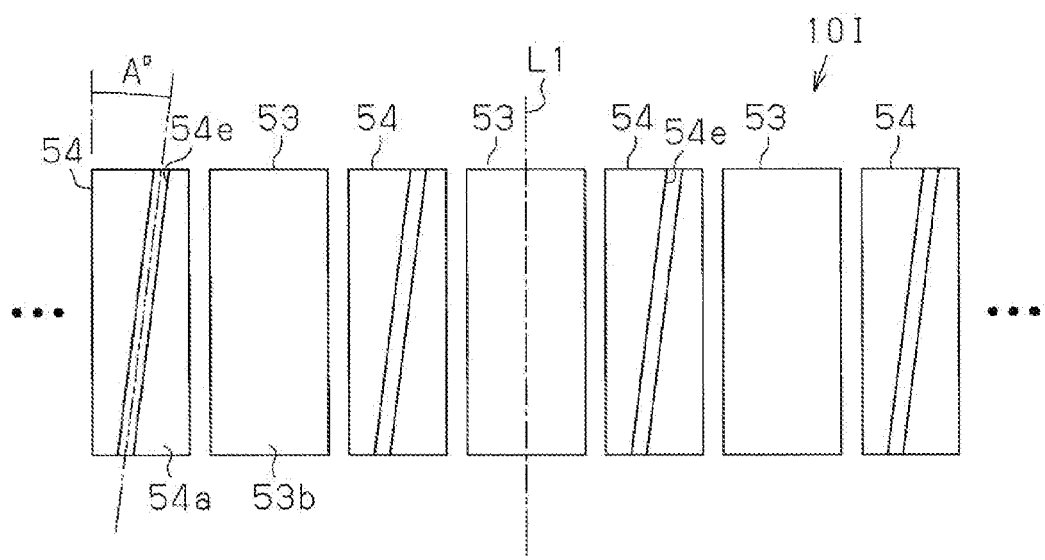
FIG. 43 is a developed partial view of the rotor for explaining inclined slits in a motor according to a modification of the eighth embodiment.

In a rotor 10I used in a motor M according to the present embodiment, a single slit 54e is formed in the outer surface 54a of each salient pole 54 as shown in FIGS. 42 and 43. Each slit 54e extends along a direction inclined relative to the axis L1 of the rotor 10I as viewed from the radially outer side. The slit 54e on the outer surface 54a of each salient pole 54 improves the flow of magnetic flux in the salient pole 54 by dispersing the flow in the circumferential direction, as in the sixth embodiment. In addition, the flow of magnetic flux in each salient pole 54 is changed smoothly, so as to smooth the entire waveform of the cogging torque. In other words, the "skew effect" is achieved. Accordingly, vibration of the motor M is reduced.

When the inclination angle A° of each slit 54e relative to the axis L1 as viewed from the radially outside is changed, the cogging torque is changed, accordingly. Therefore, the cogging torque ratio in relation to the inclination angle A° was measured. In this case, the cogging torque was measured while changing the inclination angle A° of each slit 54e and the ratio A°/(360°/N), in which N is the least common multiple of the number of teeth 61a of the stator 60 (the number of slots) and the number of the magnetic poles of the rotor 10I (the sum of the number of the magnets 53 and the number of the salient poles 54).

Figure 44:
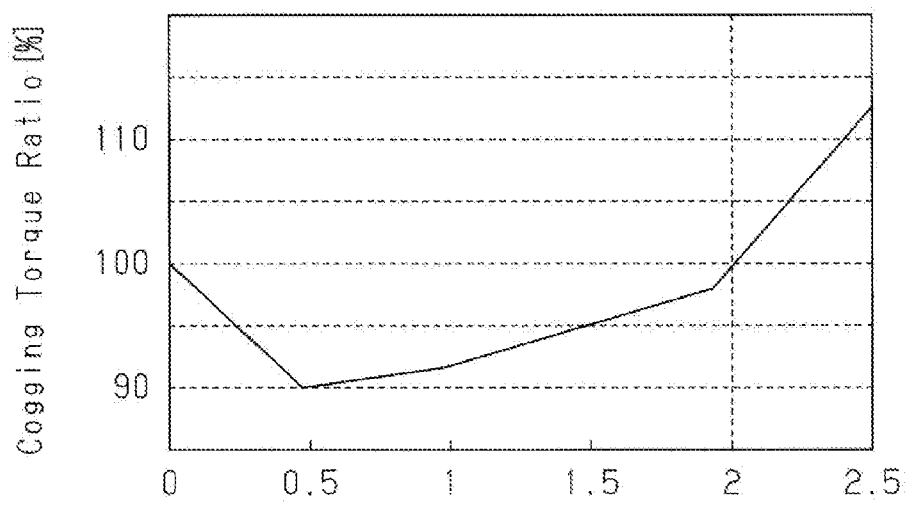
FIG. 44 is a graph showing the relationship between the ratio A°/(360°/N) and the cogging torque of the motor shown in FIG. 42.

FIG. 44 shows the cogging torque when the ratio A°/(360°/N) was changed. The cogging torque when the ratio A°/(360°/N) was zero, that is, when the slits 54e were not inclined, was set as 100%. The cogging torque decreased until the ratio A°/(360°/N) reached approximately 0.5, and had the minimum value of approximately 90% when the ratio was approximately 0.5. Further, as the ratio A°/(360°/N) increased, the cogging torque gradually increased. When the ratio A°/(360°/N) was approximately 1.0, the cogging torque was approximately 92%. Then, the rate of increase was slightly increased. When the ratio A°/(360°/N) was approximately 1.9, the cogging torque was approximately 98%, and when the ratio A°/(360°/N) was approximately 2.0, the ratio A°/(360°/N) was approximately 100%. With reference to FIG. 44, the cogging torque was reduced in the range where $0 < A°/(360°/N) \leq 2$. It is therefore preferable that the ratio A°/(360°/N) be set in this range. Particularly, the ratio A°/(360°/N) is more preferably set at about 0.5, since the cogging torque is sufficiently reduced. In the present embodiment, the number of the teeth 61a is twelve, and the number of the magnetic poles in the rotor 10I is fourteen (the least common multiple N=84). Therefore, an inclination angle of the slit 54e that makes the ratio A°/(360°/N) be 0.5 is approximately 2.1°. This inclination angle minimizes the cogging torque.

Figure 45:
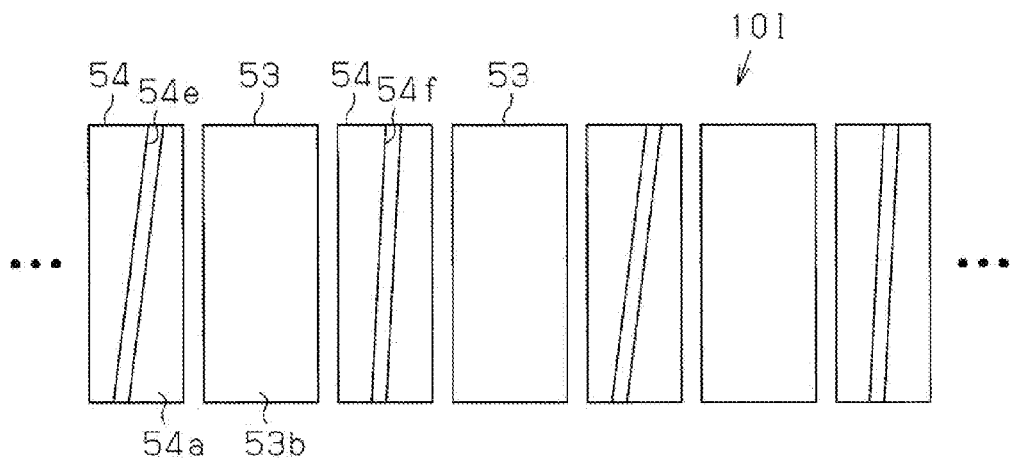
FIG. 45 is a developed partial view of the rotor for explaining inclined slits in a motor according to a modification of the eighth embodiment.

In the above description, the inclination angle A° of the slits 54e formed on the outer surfaces 54a of the salient poles 54 is all the same. However, as shown in FIG. 45, the slit inclination angle may be different for each salient pole 54. For example, slits 54e, 54f having different inclination angles may be arranged alternately. This configuration balances out the waveform of the cogging torque generated in each salient pole 54, thereby further reducing the cogging torque.

Figure 46:
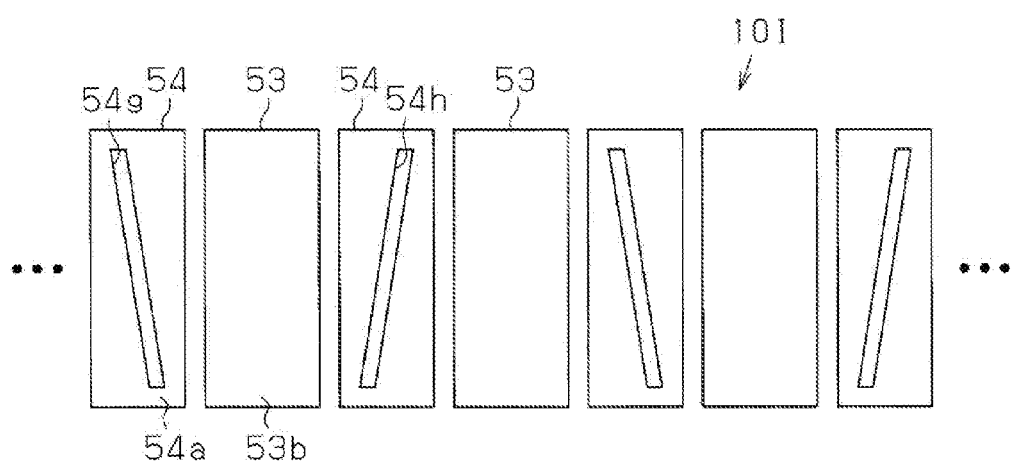
FIG. 46 is a developed partial view of the rotor for explaining inclined slits in a motor according to a modification of the eighth embodiment.

Instead of providing the slits 54e, 54f, which are inclined in the same direction relative to the axis L1, slits 54g, 54h, which are inclined in different directions may be formed in the salient poles 54 as shown in FIG. 46. The slits 54g, 54h, which are inclined in different directions, balance out the waveform of the cogging torque generated in each salient pole 54, thereby further reducing the cogging torque. Further, the direction of inclination of each slit may be changed at one point in the axial direction.

Alternatively, slits 54g, 54h may be formed, which do not extend to the axial ends of the rotor core 52. That is, the slits 54g, 54h are shorter than the rotor core 52 in the axial direction.

Figure 47:
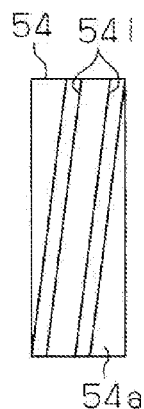
FIG. 47 is a developed partial view of the rotor for explaining inclined slits in a motor according to a modification of the eighth embodiment.

Unlike the slits 54e, 54f, 54g, 54h, each of which is formed in each salient pole 54, two inclined slits 54i may be formed in each salient pole 54 as shown in FIG. 47. Further, three or more slits may be formed in each salient pole 54.

The present embodiment has the following advantages.

(18) In the rotor 10I of the present embodiment, the slit 54e is formed in the outer surface 54a of each salient pole 54 as shown in FIG. 42 (the slits 54f to 54h in the modifications). That is, the slits 55e formed in each salient pole 54 improve the flow of magnetic flux in the salient pole 54 and the teeth 61a in the present embodiment, so that the flow approximates the flow of magnetic flux in the magnets 53. This improves the magnetic balance of the rotor 10I, and therefore reduces motor vibration.

(19) According to the present embodiment, the slit 54e is continuously formed in the outer surface 54a of each salient pole 54 to be inclined relative to the axis L1 of the rotor 10I. That is, the slits 54e improve the flow of magnetic flux in the salient poles 54 and achieve the "skew effect," in which the magnetic flux in the salient poles 54 flow smoothly so that the waveform of the cogging torque becomes rounded off. Accordingly, the motor vibration is further reduced.

The above described embodiments may be modified as follows.

In the first to third embodiments, the ranges of the ratio Ws/Wm of the widths Ws of the slits 12b and the width Wm of the magnets 13 and the ratio Wt/Wn of the width Wt of the slits 12c and the width Wn of the salient poles may be changed as necessary depending on the conditions.

Figure 48A:
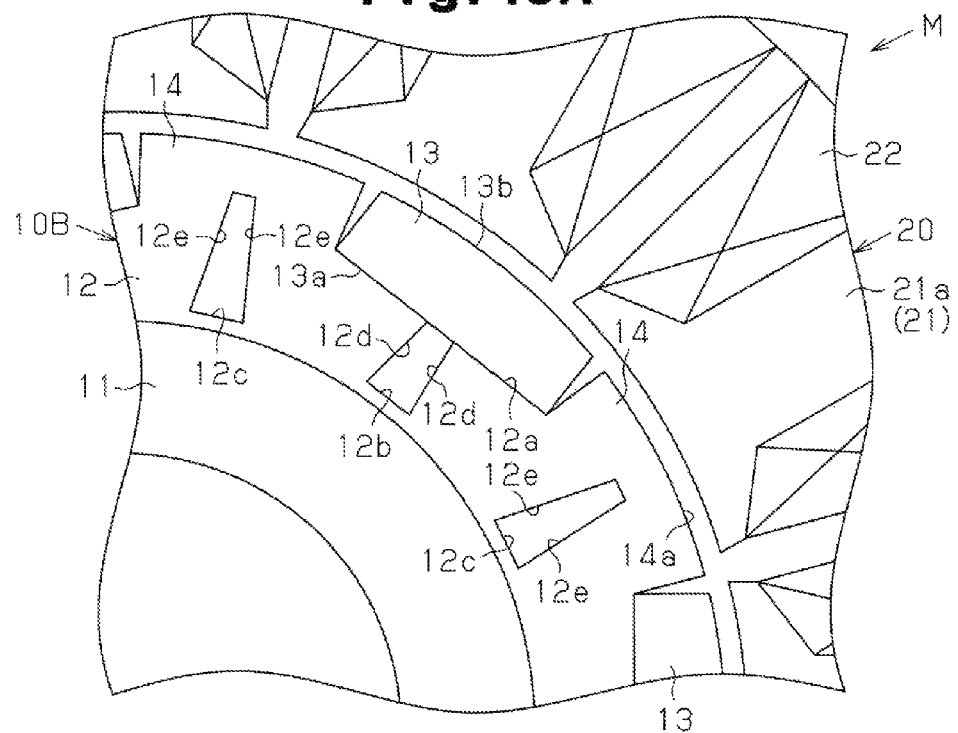
FIG. 48A is an enlarged partial view illustrating a motor according to a modification of the first and second embodiments.
Figure 48B:
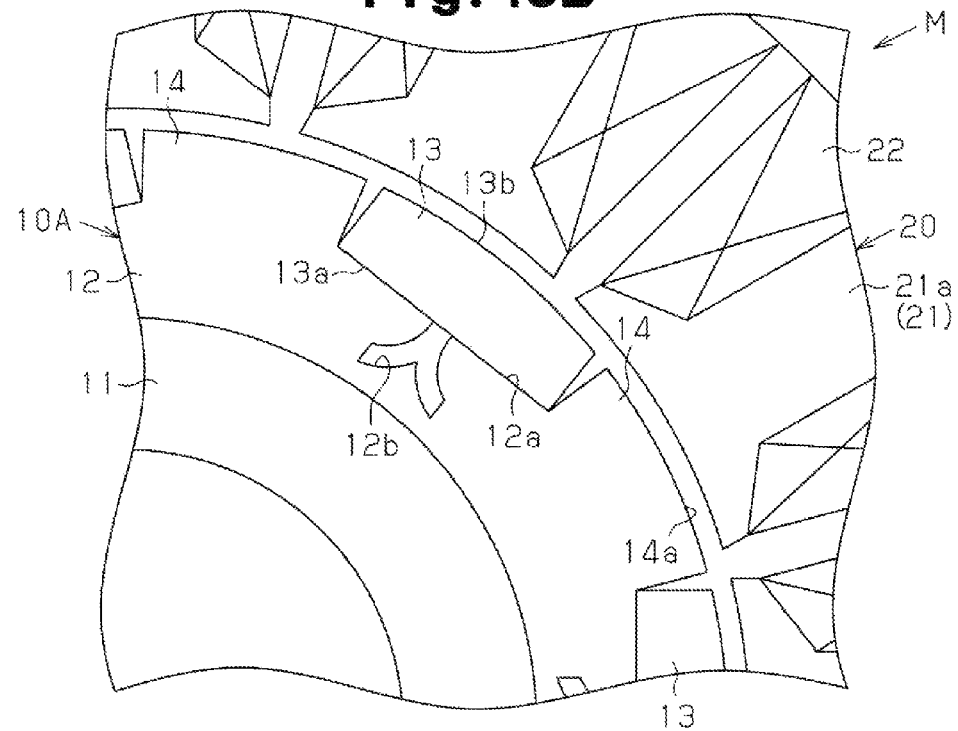
FIG. 48B is an enlarged partial view illustrating a motor according to a modification of the first embodiment.

The slits 12b of the first embodiment may be replaced by slits 12b shown in FIGS. 48A and 48B. The slits 12b, 12c of the second embodiment may be replaced by slits 12b, 12c shown in FIG. 48A. In the slit 12b shown in FIG. 48A, inner surfaces 12*d*, which face each other in the circumferential direction, are formed as flat surfaces, such that the distance of them increases toward the radially inner end. That is, the width of each slit 12*b* (circumferential dimension) increases toward the radially inner end. In the first and second embodiments, the inner surfaces 12*d* in each slit 12*b* are parallel with each other. If the width of each slit 12*b* increases along the radial direction as shown in FIG. 48A, magnetic flux is permitted to easily flow in the salient poles 14 compared to the first and second embodiments.

As shown in FIG. 48A, each slit 12*c* has the same shape as the slits 12*b*. That is, in each slit 12*c*, inner surfaces 12*e*, which face each other in the circumferential direction, are formed as flat surfaces, such that the distance of them increases toward the radially inner end. If the width of each slit 12*c* is great, magnetic flux is permitted to easily flow toward the salient poles 14 compared to the second embodiment. FIG. 48A shows an example in which the slits 12*b* having the shape presented above are applied to the slits 12*b*, 12*c* of the second embodiment. However, the slits 12*b* may be applied to the first embodiment, which does not have slits 12*c*.

As shown in FIG. 48B, each slit 12*b* may be bifurcated toward the radially inner end as shown in FIG. 48B, while being curved toward both sides in the circumferential direction. This shape of the slits 12*b* allows magnetic flux flowing in the vicinity of the adherence surfaces 12*a* to flow in desired courses, that is, toward the salient poles 14 on both sides in the circumferential direction. FIG. 48 shows an example in which the slit 12*b* of the first embodiment is changed to a bifurcated shape. However, the slits 12*b* of the second embodiment may have the shape shown in FIG. 48B.

Figure 49A:
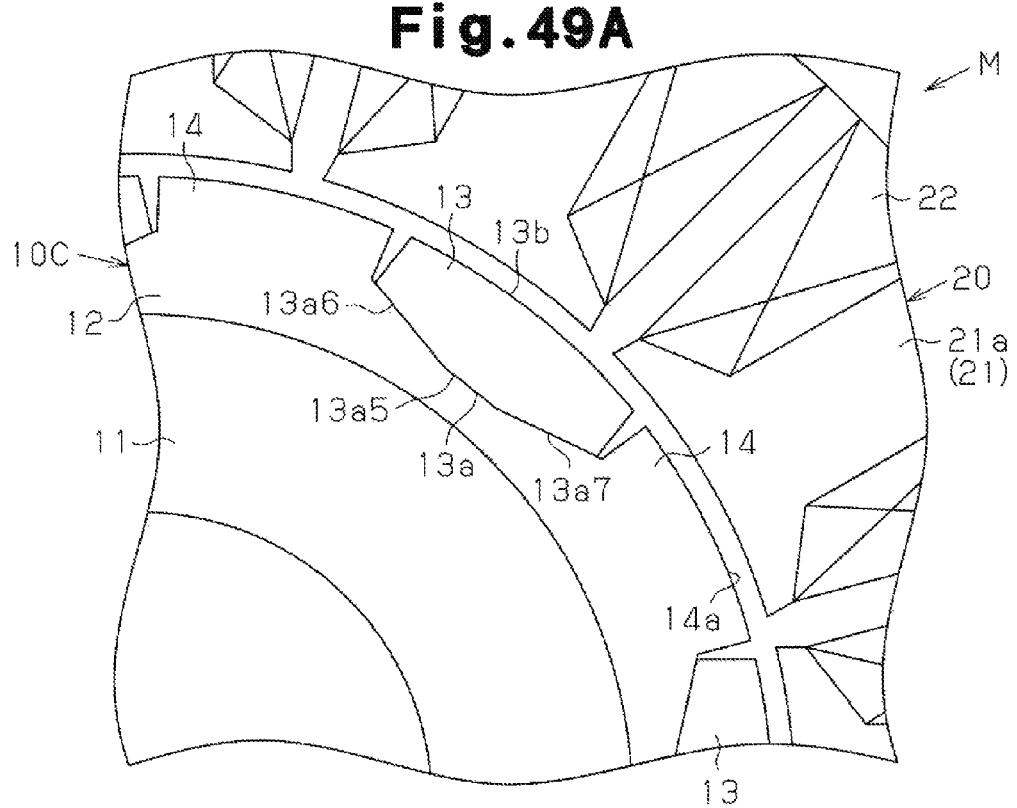
FIG. 49A is an enlarged partial view illustrating a motor according to a modification of the third embodiment.

In the third embodiment, the shape of the inner surface 13*a* of the magnet 13 and the shape of the adherence surface 12*a* of the rotor core 12 are not particularly limited. For example, as shown in FIG. 49A, the cross section perpendicular to the axial direction of the rotary shaft 11 of the inner surface 13*a* of each magnet 13 may have a trapezoidal shape such that the center in the circumferential direction of the inner surface 13 protrudes radially inward. Each inner surface 13*a* is formed by a flat portion 13*a*5 at the center in the circumferential direction and inclined portions 13*a*6, 13*a*7, which are formed on both sides of the flat portion 13*a*5 in the circumferential direction. This configuration increases the radial dimension (thickness) of each magnet 13 in a circumferentially center portion compared to the third embodiment, in which the inner surface 13*a* of each magnet 13 is formed to be triangular. As a result, a rotor that generates great magnetic flux is obtained.

Figure 49B:
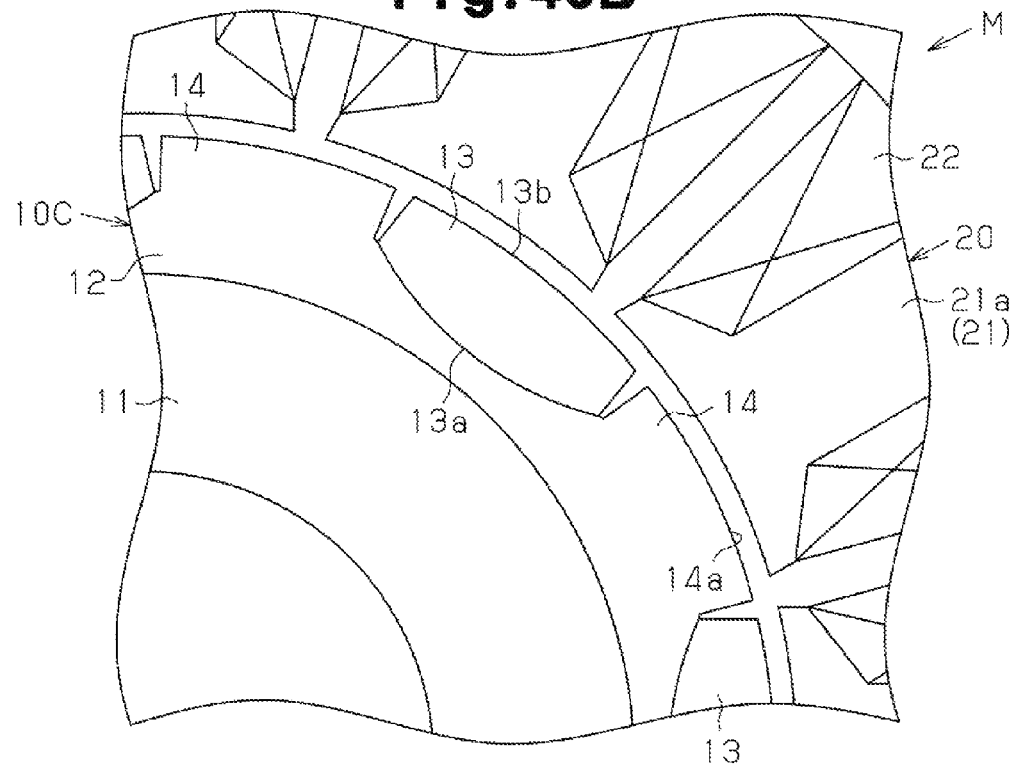
FIG. 49B is an enlarged partial view illustrating a motor according to a modification of the third embodiment.

Also, as shown in FIG. 49B, the inner surface 13*a* of each magnet 13 may be arcuate such that the center in the circumferential direction protrudes radially inward. This configuration increases the radial dimension (thickness) of each magnet 13 in circumferential end portions compared to the magnets 13 shown in FIG. 49B. As a result, a rotor that generates great magnetic flux is obtained.

In the fourth embodiment, each coupling portion 43 contacts the inner surface 34 of the corresponding magnet 34 (the ratio G/T is zero). However, the configuration is not particularly limited, but may be modified as shown in FIG. 23. That is, each coupling portion 43 does not need to contact the inner surface 34*a* of the corresponding magnet 43 (0<G/T≦0.4). Even this configuration allows the coupling portion 43 to be magnetically saturated with the magnetic flux from the inner surface 34*a* of the corresponding magnet 34. Therefore, magnetic flux is prevented from flowing into the salient pole block 35, through which magnetic flux should not pass. Thus, the magnetic flux is evenly divided in each coupling portion 43 from the circumferential center to both sides in the circumferential direction regardless of the positional relationship with the teeth 37*a*. Also, a welding portion between laminated steel sheets of the rotor core 33 can be provided between each coupling portion 43 and the inner surface 34*a* of the corresponding magnet 34. This increases the rigidity of the rotor core 33 while reducing the influence on the rotational performance.

As shown in FIG. 23, the inner surface 34*a* of each magnet 34 is formed to protrude radially inward. A part of the inner surface 34*a* that is fixed to the outer surface (the adherence surface 33*a*) of the base 42 is formed as an inclined portion 34*c*. The outer surface of the base 42 is inclined so as to correspond to the inclined portion 34*c*, allowing the position of the magnet 34 facing the inner surface 34*a* to be determined. This permits the magnet 34 to be accurately fixed. Also, since the inclined portion 34*c* of the magnet 34 guides magnetic flux so as to divide the magnetic flux from the circumferential center to both sides in the circumferential direction, the magnetic flux from the inner surface 34*a* of the magnet 34 is easily evenly divided between both sides in the circumferential direction from the circumferential center.

In the fourth embodiment, the coupling portion 43 is integrally formed with the salient pole block 35. However, the coupling portion 43 may be formed separately from the salient pole block 35.

In the fourth embodiment, the magnetic resistance of each coupling portion 43 may be increased, for example, by applying stress on each coupling portion 43 to deform it so that the magnetic property is degraded, by changing the material of the coupling portion 43, or by changing the magnetic property of the coupling portion by laser irradiation.

In the fourth embodiment, the space S is void. Instead, the space S may be filled with a nonmagnetic portion 32.

In the fourth embodiment, the range of the ratio G/T of the gap length G and the radial dimension T of the magnet 34 and the range of the ratio (Wa/Wm)/(Wb×(ρb/ρr)) may be changed as necessary.

In the fourth embodiment, the shape of the magnets 34 and the shape of the rotor core 33, which includes the salient blocks 35 and the coupling portions 43, may be changed as necessary.

In the fourth embodiment, the magnets 34 are used as south poles, and the salient poles 41 are used as north poles. However, the magnets 34 may be used north poles, and the salient poles 41 may be used as south poles.

The configurations of the fifth to eight embodiments may be added to the first to fourth embodiments.

The ranges of the values in the fifth to eight embodiment may be changed as necessary depending on the conditions.

In the above illustrated embodiments, the present invention is applied to the rotors 10A to 10I used in the inner rotor motor M. However, the present invention may be applied to an outer rotor motor.

The number of magnetic poles of the rotors 10A to 10I and the stator 20 is not limited to that described in the first to eighth embodiments, but may be changed as necessary.

What is claimed is:

1. A rotor comprising:
a rotor core;
a plurality of magnets along a circumferential direction of the rotor core, each magnet functioning as a first magnetic pole and having a backside facing the rotor core; and
a plurality of salient poles integrally formed with the rotor core, each salient pole being located between a circumferentially adjacent pair of the magnets, and functioning as a second magnetic pole different from the first magnetic poles,
wherein the rotor core includes a magnetic flux dividing portion at each position that faces one of the magnets, each magnetic flux dividing portion dividing magnetic flux in the vicinity of the backside of the corresponding magnet to both sides in the circumferential direction.

2. The rotor according to claim 1, wherein the magnetic flux dividing portions are slits.

3. The rotor according to claim 1, wherein the magnetic flux dividing portions are each provided in a part of the rotor core that contacts the backside of the corresponding magnet.

4. The rotor according to claim 1, wherein the rotor core has contact surfaces each contacting the backside of one of the magnets, each contact surface having a pair of inclined surfaces, which extend away from each other in the circumferential direction from the circumferential center of the contact surface, wherein each pair of the inclined surfaces functions as the magnetic flux dividing portion.

5. The rotor according to claim 4, wherein the backside of each magnet is formed to protrude radially inward.

6. The rotor according to claim 1, wherein each magnetic flux dividing portion is configured to divide magnetic flux in the vicinity of the backside of the corresponding magnet to both sides in the circumferential direction at a center in the circumferential direction.

7. The rotor according to claim 1, wherein each salient pole includes in it a magnetic flux straightening portion that changes the direction of magnetic flux that passes through the salient pole.

8. The rotor according to claim 1, wherein the rotor core includes:
a plurality of salient pole blocks having the salient poles, each salient pole block being located between a circumferentially adjacent pair of the magnets;
a plurality of spaces each provided at a position facing the backside of one of the magnets, each space being located between a circumferentially adjacent pair of the salient pole blocks, the spaces functioning as the magnetic flux dividing portions; and
a plurality of coupling portions, each coupling a circumferentially adjacent pair of the salient blocks,
wherein each coupling portion is formed so as to be magnetically saturated by the magnetic flux in the vicinity of the backside of the corresponding magnet.

9. The rotor according to claim 8, wherein, when a gap length between each magnet and the corresponding coupling portion and the radial dimension of the magnets are expressed by G and T, respectively, the ratio G/T is less than or equal to 0.4.

10. The rotor according to claim 9, wherein each coupling portion is formed to contact the backside of the corresponding magnet.

11. A rotor comprising:
a rotor core;
a plurality of magnets along a circumferential direction of the rotor core, each magnet functioning as a first magnetic pole and having a surface that is exposed to the outside; and
a plurality of salient poles integrally formed with the rotor core, each salient pole being located between a circumferentially adjacent pair of the magnets, and functioning as a second magnetic pole different from the first magnetic poles, wherein a space is formed between a circumferentially adjacent pair of the magnets and the corresponding salient pole,
wherein a slit is formed either in a distal surface of each salient pole or inside each salient pole,
wherein the slits are each formed in the distal surface of the corresponding salient pole, and
wherein the radial dimension of each slit is less than the protruding length of each salient pole.

12. A rotor comprising:
a rotor core;
a plurality of magnets along a circumferential direction of the rotor core, each magnet functioning as a first magnetic pole and having a surface that is exposed to the outside; and
a plurality of salient poles integrally formed with the rotor core, each salient pole being located between a circumferentially adjacent pair of the magnets, and functioning as a second magnetic pole different from the first magnetic poles, wherein a space is formed between a circumferentially adjacent pair of the magnets and the corresponding salient pole,
wherein a slit is formed either in a distal surface of each salient pole or inside each salient pole,
wherein the slits are each formed in the distal surface of the corresponding salient pole, and
wherein the radial dimension of each slit is equal to the protruding length of each salient pole.

13. A rotor comprising:
a rotor core;
a plurality of magnets along a circumferential direction of the rotor core, each magnet functioning as a first magnetic pole and having a surface that is exposed to the outside; and
a plurality of salient poles integrally formed with the rotor core, each salient pole being located between a circumferentially adjacent pair of the magnets, and functioning as a second magnetic pole different from the first magnetic poles, wherein a space is formed between a circumferentially adjacent pair of the magnets and the corresponding salient pole,
wherein a slit is formed either in a distal surface of each salient pole or inside each salient pole,
wherein the rotor core is formed by laminating a plurality of steel sheets,
wherein each slit is formed inside the corresponding salient pole, and
wherein the laminated steel sheets are coupled together by swaging members each inserted in one of the slits, so that the rotor core is formed.

14. A rotor comprising:
a rotor core;
a plurality of magnets along a circumferential direction of the rotor core, each magnet functioning as a first magnetic pole and having a surface that is exposed to the outside; and
a plurality of salient poles integrally formed with the rotor core, each salient pole being located between a circumferentially adjacent pair of the magnets, and functioning as a second magnetic pole different from the first magnetic poles, wherein a space is formed between a circumferentially adjacent pair of the magnets and the corresponding salient pole,
wherein a slit is formed either in a distal surface of each salient pole or inside each salient pole,
wherein the slits are each formed in the distal surface of the corresponding salient pole, and
wherein each slit extends to be inclined in relation to the axis of the rotor.

15. A motor comprising:
a stator; and
a rotor, wherein the rotor includes:
a rotor core;
a plurality of magnets along a circumferential direction of the rotor core, each magnet functioning as a first magnetic pole and having a backside facing the rotor core; and
a plurality of salient poles integrally formed with the rotor core, each salient pole being located between a circumferentially adjacent pair of the magnets, and functioning as a second magnetic pole different from the first magnetic poles,
wherein the rotor core includes a magnetic flux dividing portion at each position that faces one of the magnets, each magnetic flux dividing portion dividing magnetic flux in the vicinity of the backside of the corresponding magnet to both sides in the circumferential direction.

* * * * *